United States Patent
Glasscock et al.

(10) Patent No.: US 11,587,698 B2
(45) Date of Patent: Feb. 21, 2023

(54) ELECTRIC SUBMERSIBLE PUMP (ESP) POWER CABLE SPLICE CONTAINMENT FILLER

(71) Applicant: Halliburton Energy Services, Inc., Houston, TX (US)

(72) Inventors: Terry Lynn Glasscock, Vinita, OK (US); Joseph Michael Munoz, Odessa, TX (US); David Keith Marricle, Snyder, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 200 days.

(21) Appl. No.: 17/152,510

(22) Filed: Jan. 19, 2021

(65) Prior Publication Data

US 2022/0230781 A1    Jul. 21, 2022

(51) Int. Cl.
*H01B 7/08* (2006.01)
*H01B 7/02* (2006.01)
(Continued)

(52) U.S. Cl.
CPC ......... *H01B 7/0838* (2013.01); *E21B 17/003* (2013.01); *E21B 43/128* (2013.01);
(Continued)

(58) Field of Classification Search
CPC . H01B 3/445; H01B 7/02; H01B 7/04; H01B 7/08; H01B 7/0832; H01B 7/0838;
(Continued)

(56) References Cited

U.S. PATENT DOCUMENTS

| 4,586,774 A | * | 5/1986 | Didier | ................. H02G 15/10 |
| | | | | 439/274 |
| 5,478,970 A | * | 12/1995 | Lawler | ................ E21B 17/023 |
| | | | | 174/77 R |

(Continued)

FOREIGN PATENT DOCUMENTS

| WO | 2016089619 A1 | 6/2016 |
| WO | 2020023076 A1 | 1/2020 |

OTHER PUBLICATIONS

Foreign Communication from Related Application—International Search Report and Written Opinion of the International Searching Authority, International Application No. PCT/US2021/015061, dated Oct. 5, 2021, 11 pages.

*Primary Examiner* — William H. Mayo, III
(74) *Attorney, Agent, or Firm* — Conley Rose, P.C.; Rodney B. Carroll

(57) ABSTRACT

An electric submersible pump (ESP) power cable. The ESP power cable has a first plurality of electric conductors encased in a first protective armor wherein a first void area is defined between the first plurality of electric conductors and the first protective armor, has a second plurality of electric conductors encased in a second protective armor wherein a second void area is defined between the second plurality of electric conductors and the second protective armor and wherein each one of the second plurality of electric conductors is spliced to a corresponding one of the first plurality of electric conductors, has a first filler positioned at least partially in the first void area, and comprises a second filler positioned at least partially in the second void area.

20 Claims, 6 Drawing Sheets

(51) Int. Cl.
  *H01B 7/29*  (2006.01)
  *E21B 17/00* (2006.01)
  *H01B 13/22* (2006.01)
  *H01B 13/00* (2006.01)
  *E21B 43/12* (2006.01)
  *H01B 3/44*  (2006.01)

(52) U.S. Cl.
  CPC ........... *H01B 3/445* (2013.01); *H01B 7/0216* (2013.01); *H01B 7/292* (2013.01); *H01B 13/0036* (2013.01); *H01B 13/221* (2013.01)

(58) Field of Classification Search
  CPC .. H01B 7/1895; H01B 7/292; H01B 13/0036; H01B 13/221; E21E 17/003; E21E 43/128; H01R 4/02; H01R 4/60
  USPC ......... 174/74 R, 75 R, 77 R, 78, 84 R, 84 C, 174/88 R, 93, 117 R, 117 F; 439/587, 439/281, 191–192, 194–195; 29/869–871, 827, 887, 867
  See application file for complete search history.

(56) References Cited

U.S. PATENT DOCUMENTS

| | | | |
|---|---|---|---|
| 7,405,358 B2 * | 7/2008 | Emerson | H01R 13/5216 174/88 R |
| 7,980,873 B2 * | 7/2011 | Emerson | H01R 13/523 439/191 |
| 8,209,855 B2 * | 7/2012 | Hilberts | H01R 4/20 29/869 |
| 2004/0118590 A1 | 6/2004 | Head | |
| 2011/0011617 A1 * | 1/2011 | Walid | H01B 7/0869 174/116 |
| 2012/0121224 A1 | 5/2012 | Dalrymple et al. | |
| 2020/0265972 A1 * | 8/2020 | Glasscock | H01B 7/1895 |

\* cited by examiner

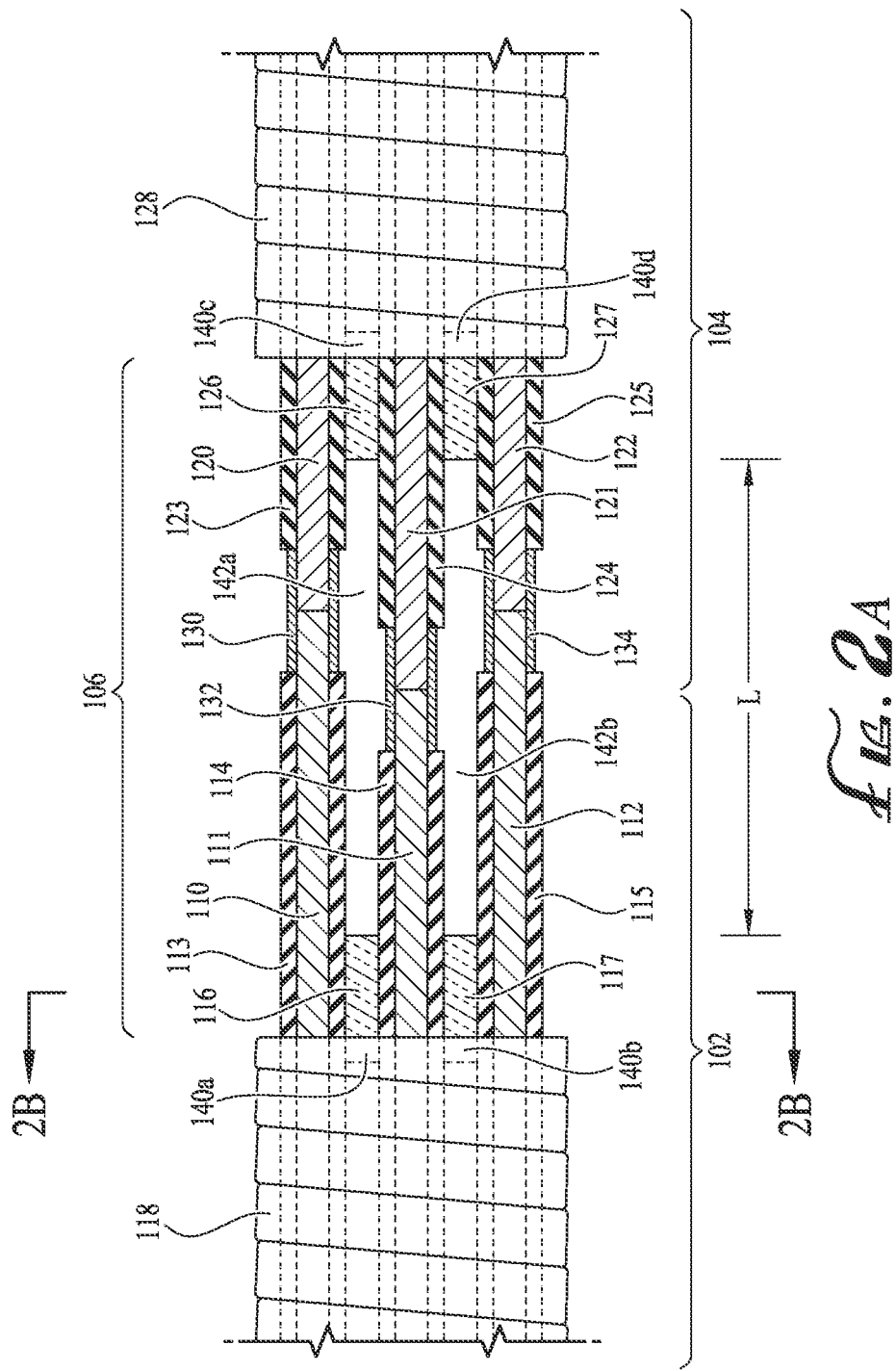

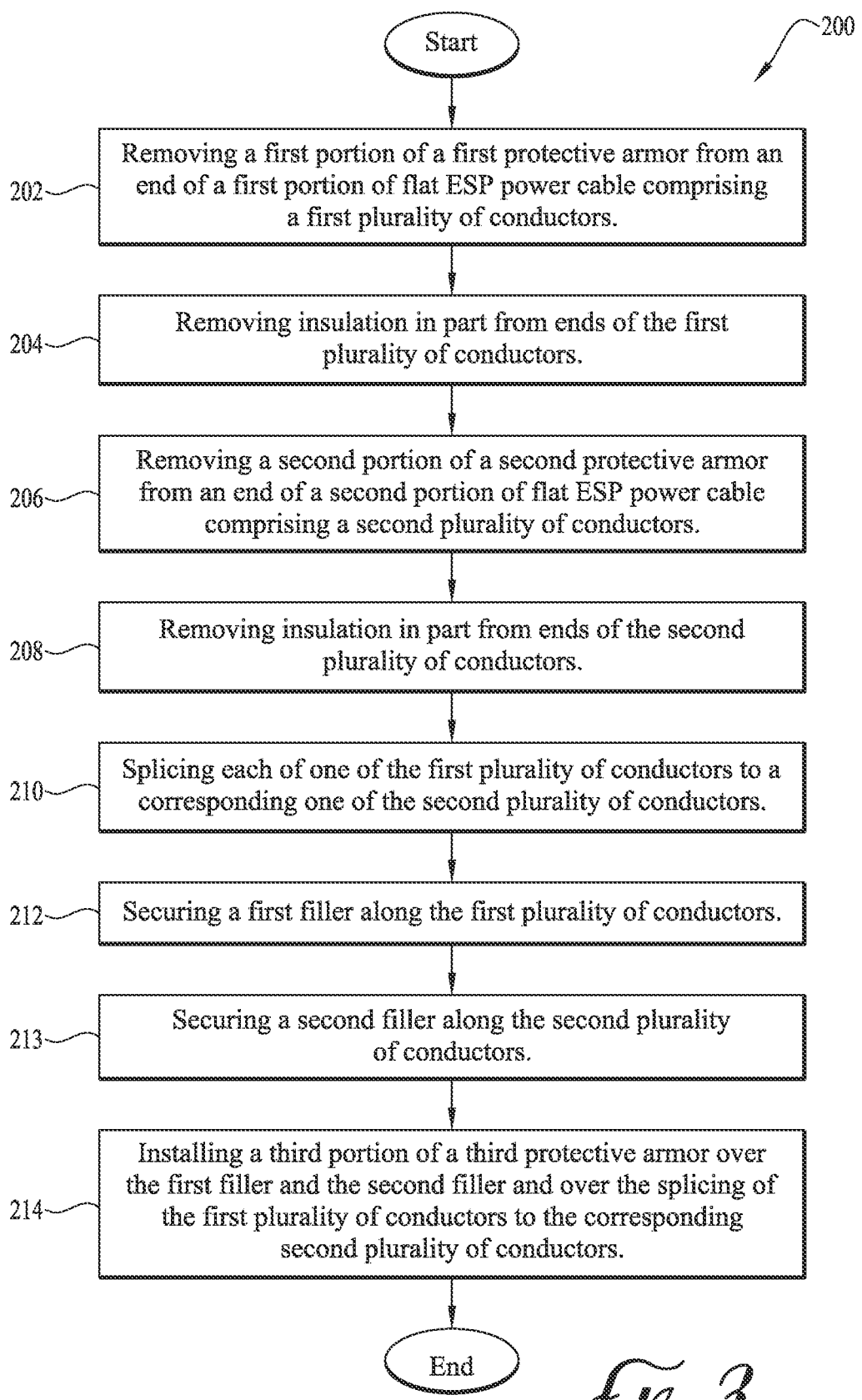

ELECTRIC SUBMERSIBLE PUMP (ESP) POWER CABLE SPLICE CONTAINMENT FILLER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wells may be drilled to access hydrocarbons pooled in subterranean formations. Sometimes the hydrocarbons may flow naturally to the surface, at least after initially bringing a well on-line after completion. As reservoir pressure drops, however, many wells apply an artificial lift mechanism to assist production of hydrocarbons to the surface. Artificial lift methods comprise electric submersible pumps (ESPs), rod lift, plunger lift, gas lift, charge pumps, and other lift methods. ESPs may receive electric power via an electric power cable that couples the ESP to an electric power source at the surface, for example from a variable speed drive or other electric power conditioning equipment.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2A is an illustration of an electric submersible pump (ESP) power cable splice according to an embodiment of the disclosure.

FIG. 3 is a flow chart of a method according to an embodiment of the disclosure.

DETAILED DESCRIPTION

Figure 1:
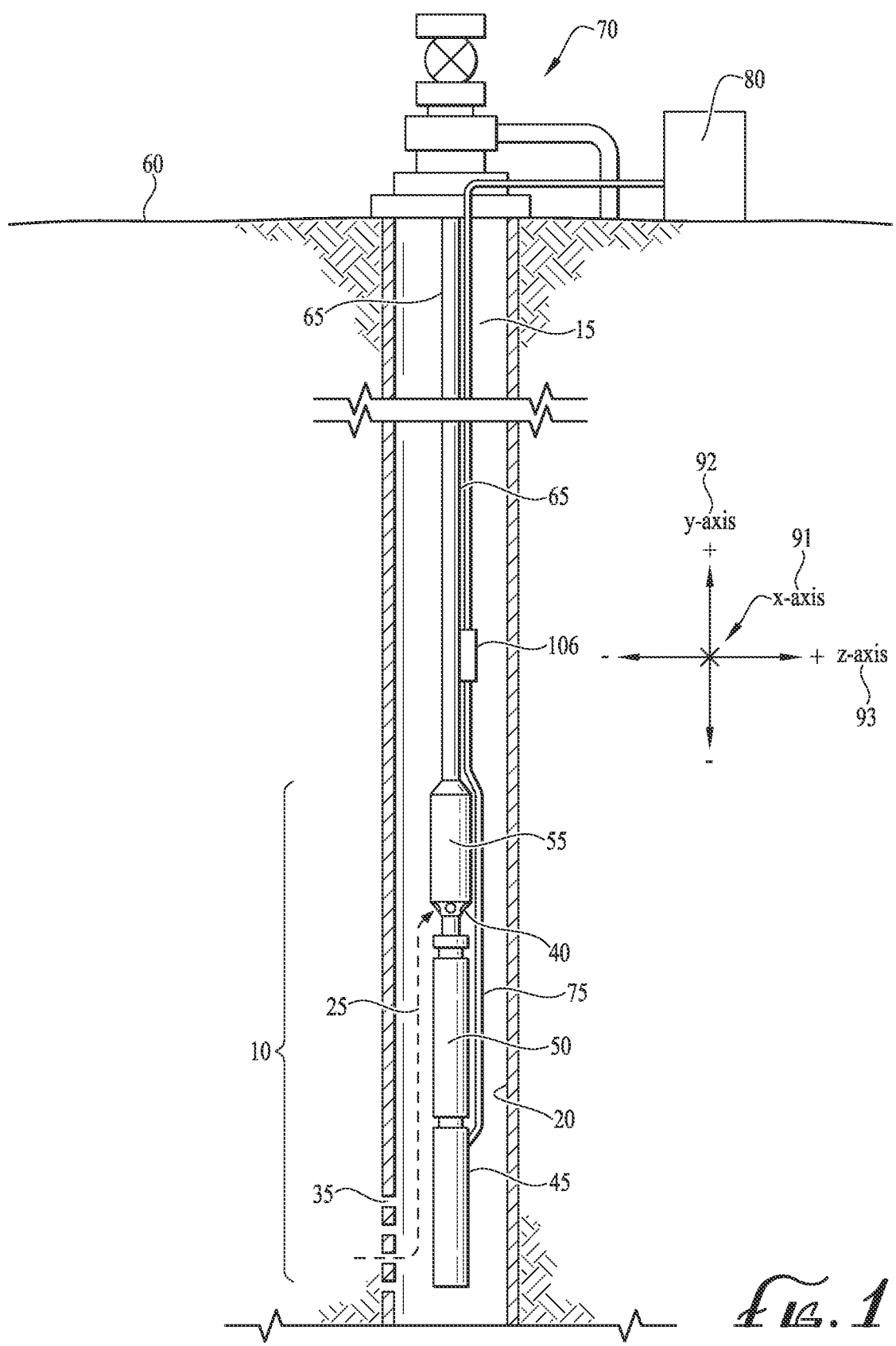
FIG. 1 is an illustration of a wellbore and an exemplary well completion according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, orientation terms "upstream," "downstream," "up," and "down" are defined relative to the direction of flow of well fluid in the well casing. "Upstream" is directed counter to the direction of flow of well fluid, towards the source of well fluid (e.g., towards perforations in well casing through which hydrocarbons flow out of a subterranean formation and into the casing). "Downstream" is directed in the direction of flow of well fluid, away from the source of well fluid. "Down" is directed counter to the direction of flow of well fluid, towards the source of well fluid. "Up" is directed in the direction of flow of well fluid, away from the source of well fluid.

Electric submersible pump (ESP) assemblies are placed in wellbores to lift production fluid to a surface where the production fluid can be recovered for use and/or disposal. Electric power is provided from the surface to the ESP assemblies located downhole by an electric power cable. Some descriptions may distinguish between a motor lead extension (MLE) cable that attaches directly to the electric motor of the ESP assembly and an electric power cable that attaches to the MLE and extends to a source of electric power at the surface proximate the wellbore. This disclosure, in most cases, will not distinguish between the MLE and the electric power cable and will refer to both as an electric power cable. Electric power cables are expensive components of a well completion system. When electric power cables fail downhole, as they sometimes do, costs are incurred not just for repairing the electric power cable but for pulling the completion string out of the wellbore and running the completion string back in with a replacement or repaired electric power cable. Additionally, production from the well is undesirably interrupted during the downtime incurred when pulling an ESP assembly out of the wellbore and running a repaired ESP assembly back into the wellbore.

Electric power cables are increasingly subjected to high temperatures close to the operational limit of the materials of the electric power cables. The insulation surrounding the electric conductors of the electric power cables can undergo thermal expansion (e.g., radial expansion) that places stress on lead sheathing material that may encapsulate the insulation and electric conductors. Another situation that can put stress on the lead sheathing material is expansion (e.g., radial expansion) caused by decompression experienced by insulation surrounding electric conductors of the electric power cables that have absorbed high pressure gas in the downhole environment when the electric power cable is brought too rapidly to the surface, for example when pulling a completion assembly out of a wellbore for maintenance. If the lead sheath encapsulation ruptures due to either of these expansion effects, damaging fluids may enter the lead sheath encapsulation and attack the insulation. Splices where one segment of an electric power cable is joined to a second segment of the electric power cable are especially vulnerable to this problem. One approach to reducing the risk of rupture of the lead sheath encapsulation at a splice point is to wrap the electric conductors (e.g., the lead encapsulating the insulation encapsulating the electric conductors) with tape that constrains the expansion of the electric conductors. Because of the limited flexibility of the electric conductors (bending the electric conductors excessively can cause weak points in the lead sheath encapsulation, in the insulation, or in the electric conductors), however, tape cannot be applied properly over the lead encapsulation completely up to the point where external protective armor stops proximate the splice. For example, because of the close working quarters between electric conductors proximate the termination of the protective armor, the portion of the electric conductors (electric conductor, insulator, and lead sheath encapsulation) from the termination of the protective armor to a point ¼ inch away from the termination of the protective armor may not be able to be properly covered with tape—wrapped smoothly and consistently tightly—so as to provide the desired protection and containment, forming a weak point.

The present disclosure teaches locating filler material at this point to prop and/or to constrain the lead encapsulation and the insulation of the electric conductors proximate the termination of the external protective armor. The filler material is selected to itself resist thermal expansion. The filler material constrains the expansion of the lead sheath encapsulation and/or the insulation, thereby avoiding the problem of rupture of the lead sheath encapsulation at this point in the splice and avoiding the problems that cascade from rupture of the lead sheath encapsulation such as degradation of the insulation encapsulated inside the lead sheath. In some contexts, the filler material may be referred to as containment filler because it may be said to contain the expansion of the insulation and/or the lead sheath encapsulating the insulation.

Figure 2B:
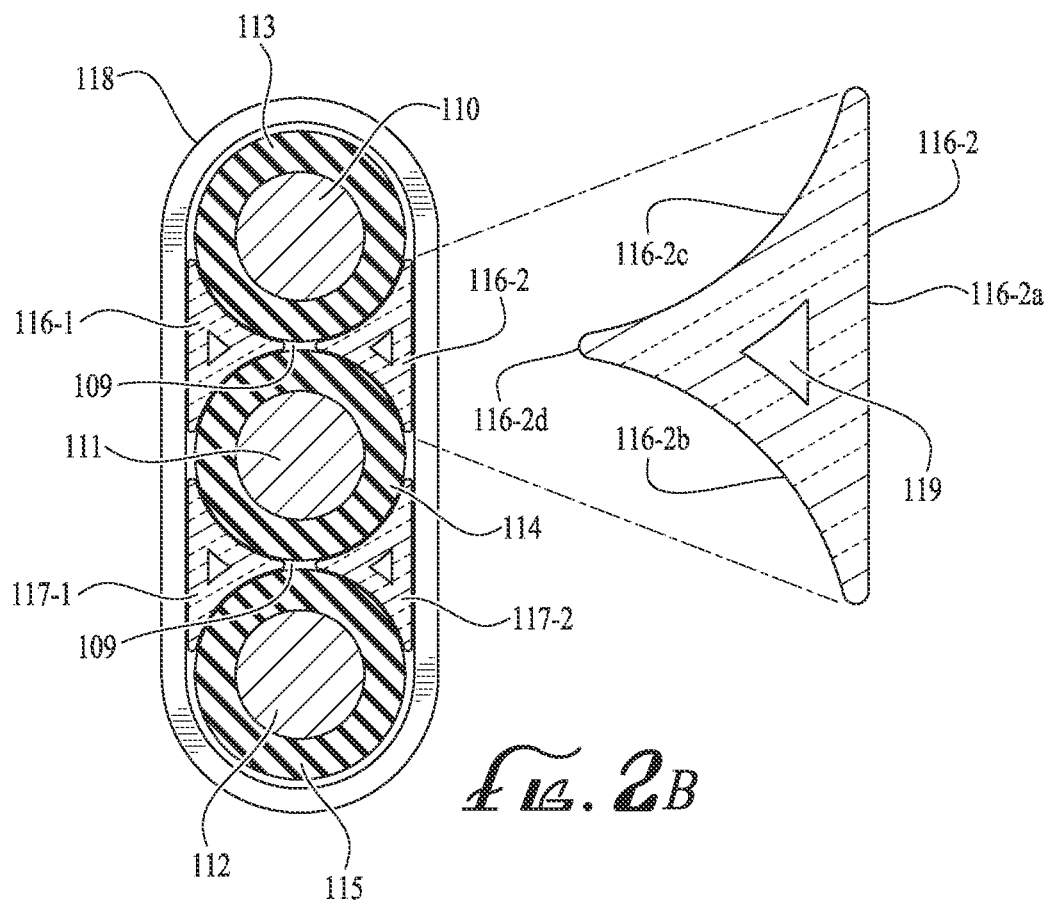
FIG. 2B is a cross-section view of the ESP power cable splice of FIG. 2A according to an embodiment of the disclosure.

Turning now to FIG. 1, a completion assembly in a wellbore is described. A wellbore 15 is shown substantially vertically aligned in FIG. 1 but may be slanted or have a vertical alignment near the surface 60 with a trajectory downhole that becomes slanted or horizontal. As shown in FIG. 1, the wellbore 15 may be cased with casing 20 and may be cemented. Alternatively, however, the wellbore 15 may be open hole. An electric submersible pump (ESP) assembly 10 may be installed in the wellbore 15. The ESP assembly 10 may comprise an electric motor 45, a seal unit 50 coupled to the electric motor 45, an inlet 40 coupled to the seal unit 50, and a pump 55 coupled to the inlet 40. The outlet of the pump 55 is coupled to a production tubing 65. An electric power cable 75 is connected to the electric motor 45 and extends along the ESP assembly 10, along the production tubing 65, to the surface 60, and is connected to an electric power source 80 located at the surface proximate a wellhead 70. In an embodiment, the electric power source 80 provides three-phase electric power to the electric power cable 75 and hence to the electric motor 45, and the electric power cable comprises three electric conductors (e.g., 110, 111, and 112 as shown in FIG. 2B).

The casing 20 may have perforations 35 that allow production fluid 25 to exit a subterranean formation, flow through the perforations 35, and flow in the wellbore 15. In operation, the electric power cable 75 supplies electric power sourced by the electric power source 80 to the electric motor 45. The electric motor 45 provides rotational mechanical power to the pump 55, e.g., via a drive shaft coupling between the electric motor 45 and the pump 55. The production fluid 25 enters the inlet 40 and is lifted to the surface 60 and the wellhead 70 by the pump 55 via the production tubing 65. In an embodiment, the electric motor 45 is a three-phase alternating current (AC) motor. In an embodiment, the pump 55 is a multistage centrifugal pump. In an embodiment, the ESP assembly 10 may comprise additional components not illustrated in FIG. 1, for example a gas separator or other completion equipment.

FIG. 1 provides a directional reference comprising three coordinate axes—an X-axis 91 where positive displacements along the X-axis 91 are directed into the sheet and negative displacements along the X-axis 91 are directed out of the sheet; a Y-axis 92 where positive displacements along the Y-axis 92 are directed upwards on the sheet and negative displacements along the Y-axis 92 are directed downwards on the sheet; and a Z-axis 93 where positive displacements along the Z-axis 93 are directed rightwards on the sheet and negative displacements along the Z-axis 93 are directed leftwards on the sheet. The Y-axis 92 is about parallel to a central axis of a vertical portion of the wellbore 15.

The electric power cable 75 may have one or more splices that electrically couple two separate segments of the electric power cable 75. Such splices may connect a motor lead extension (MLE) to a segment of electric power cable or may connect two segments of electric power cable. The electric power cable 75 may be any length. For example an electric power cable 75 may be up to 24,000 feet long or more, depending on depth/length of the wellbore 15. There is no particular limitation on the maximum length of segments of the electric power cable 75, other than possibly the length of power cable that can be wrapped on a transportable spool. In an example, about 8500 feet of an exemplary grade of electric power cable may be wound onto a 78 inch transportable wheel. Thus, as an example, a 24,000 foot electric power cable 75 may comprise three about 8,000 foot long segments of electric power cable that are spliced to each other with two splices at the location of the wellbore 15 and the whole 24,000 foot electric power cable 75 may be spliced with a third splice to a MLE proximate the electric motor 45 at the location of the wellbore 15. Splices, however, may be introduced in an electric power cable 75 at shorter intervals for various reasons. For example, the electric power cable 75 may be comprised of segments of used electric power cable 75 which may have been shortened by cutting out damaged portions. Segments of electric power cable spliced into the electric power cable 75 may be at least 10 feet long and less than 10,000 feet long, at least 40 feet long and less than 10,000 feet long, at least 100 feet long and less than 10,000 feet long, at least 200 feet long and less than 10,000 feet long, at least 300 feet long and less than 10,000 feet long, at least 400 feet long and less than 10,000 feet long, at least 600 feet long and less than 10,000 feet long, at least 1,000 feet long and less than 10,000 feet long, at least 2,000 feet long and less than 10,000 feet long. Splices may be introduced in the electric power cable 75 at a shop in addition to or instead of at the location of the wellbore 15.

Figure 2C:
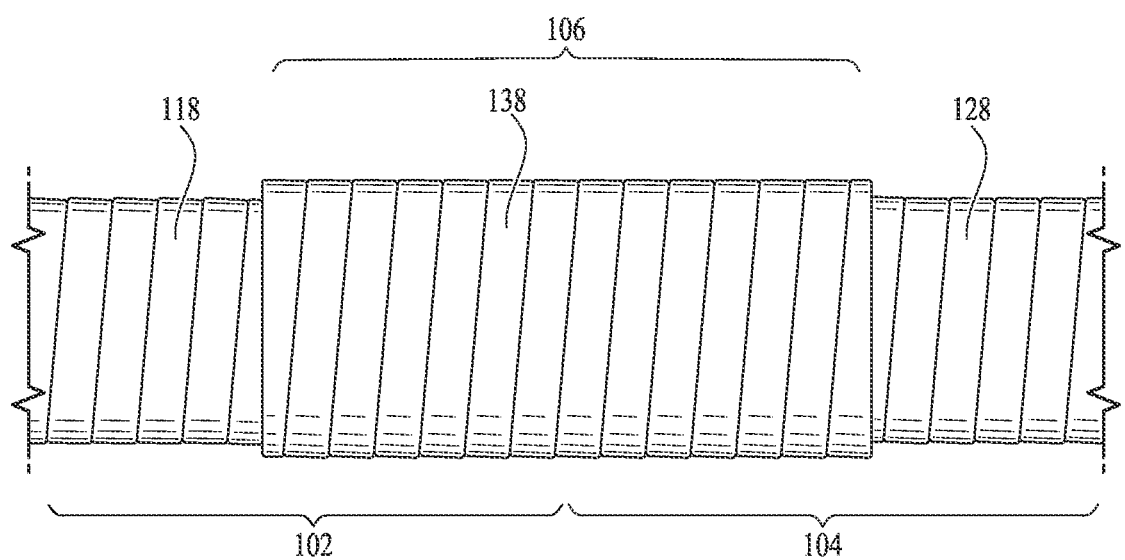
FIG. 2C is another illustration of the ESP power cable splice according to an embodiment of the disclosure.

Turning now to FIG. 2A, FIG. 2B, and FIG. 2C, a splice 106 in an electric power cable 75 is described. While the illustrations and discussion are directed to a flat profile electric power cable 75, the teachings of the disclosure may be advantageously used in round electric power cables with minor modifications of the descriptions herein. The electric power cable 75 may comprise a first segment 102 and a second segment 104 that are connected at the splice 106. In an embodiment, the first segment 102 comprises a first electric conductor 110, a second electric conductor 111, and a third electric conductor 112. The conductors 110, 111, 112 may be metal wires, for example aluminum or copper wire. The conductors 110, 111, 112 may each comprise a single strand solid metal wire. The first conductor 110 is encapsulated by a first insulation 113, the second conductor 111 is encapsulated by a second insulation 114, and the third conductor 112 is encapsulated by a third insulation 115. The first insulation 113 may be encapsulated by a first protective, inner jacket (e.g., a first metal sheath), the second insulation 114 may be encapsulated by a second protective, inner jacket (e.g., a second metal sheath), and the third insulation 115 may be encapsulated by a third protective, inner jacket (e.g., a third metal sheath). The first, second, and third metal sheaths are not illustrated in FIG. 2A to avoid cluttering the illustration. In an embodiment, the insulations 113, 114, 115 are each encapsulated in a lead metal sheath. In an embodiment, the insulations 113, 114, 115 may be each encapsulated in a different material or metal other than lead. Metal sheaths may be referred to as metal jackets, lead sheaths may be referred to as lead jackets.

The conductors 110, 111, 112 and insulations 113, 114, 115 (and protective, inner jackets, when present) are enclosed in a first protective armor 118 and (upon completion of the splice 106) in a third protective armor 138. In an embodiment, the first protective armor 118 is a metal jacket. In an embodiment, the first protective armor 118 is a metal tape that is wrapped around the conductors 110, 111, 112 and insulations 113, 114, 115 (and protective, inner jackets, when present) on a bias so as to helically wrap around and cover an extended length of the first segment 102. The first protective armor 118 and the third protective armor 138 may protect the first segment 102 as the ESP assembly 110 and production tubing 65 are run into the wellbore 15, for example protecting against impacts with the casing 20 or protrusions of the casing 20 such as collars.

In an embodiment, the second segment 104 is substantially similar to the first segment 102. In an embodiment, the second segment 104 comprises a fourth electric conductor 120, a fifth electric conductor 121, and a sixth electric conductor 122. The conductors 120, 121, 122 may be metal wires, for example aluminum or copper wire. The conductors 120, 121, 122 may each comprise a single strand of solid metal wire. The fourth conductor 120 is encapsulated in a fourth insulation 123, the fifth conductor 121 is encapsulated in a fifth insulation 124, and the sixth conductor 122 is encapsulated in a sixth insulation 125. The fourth insulation 123 may be encapsulated in a fourth protective, inner jacket (e.g., a fourth metal sheath), the fifth insulation 124 may be encapsulated in a fifth protective, inner jacket (e.g., a fifth metal sheath), and the sixth insulation 125 may be encapsulated in a sixth protective, inner jacket (e.g., a sixth metal sheath). The fourth, fifth, and sixth metal sheaths are not illustrated in FIG. 2A to avoid cluttering the illustration. In an embodiment, the insulations 123, 124, 125 are each encapsulated in a lead metal sheath. In an embodiment, the insulations 123, 124, 125 may be each encapsulated in a different material or metal other than lead. The conductors 120, 121, 122 and insulations 123, 124, 125 (and protective, inner jackets, when present) are enclosed in a protective armor 128 like the first protective armor 118 described above and also enclosed (after completion of the splice 106) in the third protective armor 138. In an embodiment, the insulation 113, 114, 115, 123, 124, 125 may comprise a polymer or elastomer such as ethylene propylene diene monomer (EPDM) rubber. Alternatively, the insulation 113, 114, 115, 123, 124, 125 may comprise other material.

The first conductor 110 is connected to the fourth conductor 120 by a first splice sleeve 130. The end of the first conductor 110 (with sufficient insulation 113 removed from the end) may be inserted into one opening of the first splice sleeve 130, the end of the fourth conductor 120 (with sufficient insulation 123 removed) may be inserted into the other opening of the first splice sleeve 130, and the first splice sleeve 130 may be crimped with a crimping tool to secure the ends of the conductors 110, 120 inside the first splice sleeve 130. In like manner, the second conductor 112 may be connected to the fifth conductor 121 by a second splice sleeve 132, and the third conductor 112 may be connected to the sixth conductor 122 by a third splice sleeve 134. In an embodiment, the lengths of the projections of conductors 110, 111, 112 beyond the first protective armor 118 and the lengths of the projections of the conductors 120, 121, 122 beyond the second protective armor 128 may be staggered as illustrated to avoid, minimize, and/or alternate overlapping of the splice sleeves 130, 132, 134 in the splice 106. Connecting the conductors 110/120, 111/121, 112/122 with the splice sleeves 130, 132, 134 as described above may be said to establish pairs of spliced conductors. For example conductor 110 coupled to conductor 120 by splice sleeve 130 may be referred to as a first pair of spliced conductors, conductor 111 coupled to conductor 121 by splice sleeve 132 may be referred to as a second pair of spliced conductors, and conductor 112 coupled to conductor 122 by splice sleeve 134 may be referred to as a third pair of spliced conductors.

The first segment 102 comprises a filler 116 located between the inside of the protective armor 118 and the protective armor 138, the first insulation 113, and the second insulation 114 and a filler 117 located between the protective armor 118 and the protective armor 138, the second insulation 114, and the third insulation 115. As best seen in FIG. 2B, the filler 116 comprises first filler element 116-1 and second filler element 116-2, and the filler 117 comprises third filler element 117-1 and fourth filler element 117-2. The first filler element 116-1 may be said to occupy a first void area defined between the inside of the protective armor 118 and the protective armor 138 and the outsides of insulations 113, 114 (or by the outside of metal sheaths encapsulating the insulations 113, 114). The second filler element 116-2 may be said to occupy a second void area defined between the inside of the protective armor 118 and the protective armor 138 and the outsides of insulations 113, 114 (or by the outside of metal sheaths encapsulating the insulations 113, 114). The third filler element 117-1 may be said to occupy a third void area defined between the inside of the protective armor 118 and the protective armor 138 and the outsides of insulations 114, 115 (or by the outside of metal sheaths encapsulating the insulations 114, 115). The fourth filler element 117-2 may be said to occupy a fourth void area defined between the inside of the protective armor 118 and the protective armor 138 and the outsides of insulations 114, 115 (or by the outside of metal sheaths encapsulating the insulations 114, 115). If the filler elements 116-1, 116-2, 117-1, 117-2 were not placed in these voids, the insulations 113, 114, 115 (or the metal sheaths encapsulating the insulations 113, 114, 115) would be able to swell unconstrained in the region of the splice 106 proximate to the termination of the protective armor 118, for example the region from the termination of the protective armor 118 to a point ¼ inch away from the termination of the protective armor 118. This is at least partially because close quarters may prevent applying tape that could otherwise effectively provide the needed containment at this point. By filling these void areas, the filler elements 116-1, 116-2, 117-1, 117-2 can prevent or reduce the swelling of the insulations 113, 114, 115 and/or the swelling of the metal sheaths encapsulating the insulations 113, 114, 115 in response to high temperatures in the downhole environment of the wellbore 15 and/or in response to decompression that occurs when the electric power cable 75 is removed from the wellbore.

In an embodiment, the filler elements 116-1, 116-2, 117-1, 117-2 each have a cross-section like that shown in an expanded view in FIG. 2B. This cross-section may be said to be quasi-triangular in shape, about triangular in shape, tricorne or tricorn in shape, or wedge-like in shape. In an aspect, the filler elements (e.g., 116-2) have a three-sided cross-section (e.g., quasi-triangular) wherein a first side 116-2a is about straight and two adjacent sides 116-2b, 116-2c are arced or curved (e.g., concave and semi-circular) and have about equal or complimentary angles of curvature compared with the outer surface of insulations 113, 114, 115 (or the outside of metal sheaths encapsulating the insulations 113, 114, or 115, when present) when measured with respect to a central axis of conductors 110, 111, 112. Accordingly, the outer surface of the insulations 113, 114, and 115 are in close, complimentary contact with the inner arced surfaces (e.g., 116-2b and 116-2c) of the filler elements 116-1, 116-2, 117-1, and 117-2. In an aspect, the inner facing tips (e.g., tip 116-2d) of each pair of corresponding filler elements (e.g. pair 116-1 and 116-2 and pair 117-1 and 117-2) are positioned proximate to each other but do not touch and otherwise are not physically adjoined or connected, resulting in a gap 109.

In an embodiment, the electric power cable 75 has a round configuration rather than a flat configuration. In this case, the conductors 110, 111, 112 and insulators 113, 114, 115 (and metal sheaths encapsulating the insulators) may be disposed not in a vertical row as seen in FIG. 2B but instead in a kind of triangular arrangement. A filler may be disposed in a center of the splice between the insulators 113, 114, 115 and three fillers placed in the voids defined between the outsides of the insulators 113, 114, 115 (or the outsides of the metal sheaths encapsulating the insulators) and the inside of the protective armor 118 and the protective armor 138. In the round cable configuration, the three fillers placed in contact with the outsides of the insulators 113, 114, 115 (or the outsides of the metal sheaths encapsulating the insulators) may have surfaces like 116-2b and 116-2a but have a differently shaped surface 116-2a. The surface of these fillers that correspond to surface 116-2a would be curved to compliment an inside diameter of the protective armor 118 and the protective armor 138.

In an embodiment, each of the filler elements 116-1, 116-2, 117-1, 117-2 define a cavity 119 that extends the length of the filler elements. The cross-section of the cavity 119 may be any suitable shape such as about triangular, round, oval, square, rectangular, or other polygon. The cavity 119 and/or gap 109 may allow for some thermal expansion of the filler element 116-1, 116-2, 117-1, 117-2 without deforming the insulation 113, 114, 115 or at least reducing the deformation that otherwise might be caused by the expansion of the filler element 116-1, 116-2, 117-1, 117-2. Accordingly, and without intending to be limited by theory, gap 109 and/or cavity 119 may provide additional flexibility and/or expandability of the fillers 116 and 117 that further cushion and protect the components within splice 106. In another embodiment, the filler elements 116-1, 116-2, 117-1, 117-2 do not define a cavity 119.

The filler elements 116-1, 116-2, 117-1, 117-2 comprise a high temperature rated material that does not swell or swells little in response to high temperature. In an embodiment, the filler elements 116-1, 116-2, 117-1, 117-2 comprise a thermoplastic. In an embodiment, the filler elements 116-1, 116-2, 117-1, 117-2 comprise fluorinated ethylene propylene (FEP). In an embodiment, the filler elements 116-1, 116-2, 117-1, 117-2 comprise Teflon™ PFA 350.

The filler elements 116-1 and 116-2 may be in intimate contact (e.g., due to contact of the complimentary arced, semi-circular surfaces) with first insulation 113 and second insulation 114 or in intimate contact (e.g., due to contact of the complimentary arced, semi-circular surfaces) with first metal sheath encapsulating first insulation 113 and second metal sheath encapsulating second insulation 114. In an embodiment, the first metal sheath encapsulating first insulation 113 may be further wrapped at least partially (e.g., from about ¼ inch away from the termination of the protective armor 118, to the first splice sleeve 130, over the first splice sleeve 130, over the fourth insulation 124, and to about ¼ inch away from the termination of the protective armor 128) in a high modulus polytetrafluoroethylene (PTFE) tape to constrain the first insulation 113 from swelling downhole. In an embodiment, the second metal sheath encapsulating the second insulation 114 may be further wrapped at least partially (e.g., from about ¼ inch away from the termination of the protective armor 118, to the second splice sleeve 132, over the second splice sleeve 132, over the fifth insulation 125, and to about ¼ inch away from the termination of the protective armor 128) in the high modulus PTFE tape to constrain the second insulation 114 from swelling downhole. The filler elements 116-1 and 116-2 may be in intimate contact (e.g., due to contact of the complimentary arced, semi-circular surfaces) with high modulus PTFE tape wrapped around the first insulation 113 or metal sheath encapsulating the first insulation 113 and in intimate contact (e.g., due to contact of the complimentary arced, semi-circular surfaces) with high modulus PTFE tape wrapped around the second insulation 114 or metal sheath encapsulating the second insulation 114.

The filler elements 117-1 and 117-2 may be in intimate contact (e.g., due to contact of the complimentary arced, semi-circular surfaces) with second insulation 114 and third insulation 115 or in intimate contact (e.g., due to contact of the complimentary arced, semi-circular surfaces) with second metal sheath encapsulating second insulation 114 and third metal sheath encapsulating third insulation 115. In an embodiment, the third metal sheath encapsulating the third insulation 115 may be wrapped at least partially (e.g., from about ¼ inch away from the termination of the protective armor 118, to the third splice sleeve 134, over the third splice sleeve 134, over the sixth insulation 126, and to about ¼ inch away from the termination of the protective armor 128) in the high modulus PTFE tape to constrain the third insulation 115 from swelling downhole. The filler elements 117-1 and 117-2 may be in intimate contact (e.g., due to contact of the complimentary arced, semi-circular surfaces) with high modulus PTFE tape wrapped around the second insulation 114 or metal sheath encapsulating the second insulation 114 and in intimate contact (e.g., due to contact of the complimentary arced, semi-circular surfaces) with high modulus PTFE tape wrapped around the third insulation 115 or metal sheath encapsulating the third insulation 115.

As best seen in FIG. 2A, ends 140a and 140b of the filler elements 116-1, 116-2, 117-1, 117-2 may extend slightly (e.g., a length of about 1, 0.9, 0.8, 0.7, 0.6, 0.5, 0.4, 0.3, 0.2, or 0.1 inches) under the edge of the protective armor 118 of the first segment 102. In embodiments, the length of the filler elements 116-1, 116-2, 117-1, 117-2 may be from about 3 inches long to about 5 inches long. In an embodiment, the length of the filler elements 116-1, 116-2, 117-1, 117-2 is about 4 inches long. Each of the filler elements 116-1, 116-2, 117-1, 117-2 are elongated in the sense that their length (seen in FIG. 2A) is greater than their thickness (e.g., cross-section as seen in FIG. 2B).

The filler elements 116-1, 116-2, 117-1, 117-2, propped by the enclosing protective armor 118, can help constrain the thermal expansion and/or swelling of the insulations 113, 114, 115 at a point where high modulus PTFE tape cannot be wrapped around the insulatons 113, 114, 115 or the metal sheath encapsulating the insulations 113, 114, 115 when making the splice 106. The filler elements 116-1, 116-2, 117-1, 117-2 can reduce the risk of the insulations 113, 114, 115 and/or the metal sheath encapsulating the insulations 113, 114, 115 swelling excessively in response to high temperatures in the downhole environment, thereby reducing the risk of rupturing metal sheaths encapsulating the insulations 113, 114, 115, thereby reducing the risk of rapid degradation of the insulations 113, 114, 115 in the presence of fluids downhole in the wellbore 15.

The second segment 104 comprises a filler 126 located between an inside of the protective armor 128, the fourth insulation 123, and the fifth insulation 124 (or between an inside the protective armor 128, a metal sheath encapsulating the fourth insulation 123, and a metal sheath encapsulating the fifth insulation 124) and a filler 127 located between the inside of the protective armor 128, the fifth insulation 124, and the sixth insulation 125 (or between the inside of the protective armor 128, a metal sheath encapsulating the fifth insulation 124, and a metal sheath encapsulating the sixth insulation 125). The filler 126 may comprise two filler elements disposed in a manner like filler elements, 116-1, 116-2 but in second segment 104. The filler 127 may comprise two filler elements disposed in a manner like filler elements 117-1, 117-2 but in second segment 104. As best seen in FIG. 2A, ends 140c and 140d of the filler elements 126 and 127 may extend slightly (e.g., a length of about 1, 0.9, 0.8, 0.7, 0.6, 0.5, 0.4, 0.3, 0.2, or 0.1 inches) under the edge of the protective armor 128 of the second segment 104. As also shown in FIG. 2A, the opposing ends of fillers 116 and 126 and the opposing ends of fillers 117 and 127 are not in contact with each other (e.g., are spaced a distance or length "L" apart from each other) as shown by unsupported/unreinforced areas or spans 142a and 142b. In an aspect, the length L of the unreinforced spans 142a and 142b can be the same or different. In one or more aspects, the length L of the unreinforced spans 142a and 142b can be the same or different and can be about 50, 46, 42, 38, 34, 30, 28, 26, 24, 22, 20, 18, 16, 14, 12, 10, 9, 8, 7, 6, 5, 4, 3, 2, 1, or 0.5 inches. Without intending to be limited by theory, the unreinforced spans 142a and 142b may provide void space that allows for the placement of spliced insulation portions over the splice sleeves 130, 132, and 134 and/or spliced protective, inner jacket portions (e.g., metal/lead sheath) encapsulating the spliced insulation portions. In an aspect, the void space provided by unreinforced spans 142a and 142b may be filled with spliced insulation portions encapsulating the splice sleeves 130, 132, and 134 and spliced protective, inner jacket portions (e.g., metal/lead sheath) encapsulating the spliced insulation portions such that the void space is substantial filled and there is insufficient void space remaining for the further encapsulation of the spliced protective, inner jacket portions (e.g., metal/lead sheath), for example with a protective tape such as high modulus PTFE tape.

The filler elements of filler 126, 127 may be similar in material composition, shape, and elongation to filler elements 116-1, 116-2, 117-1, 117-2 and likewise optionally may each define an interior cavity that extends the length of the filler elements. The filler elements making up filler 126 may be said to occupy voids defined between the inside of the protective armor 128 and the outsides of the conductors 120, 121 (or the outsides of the metal sheaths encapsulating the conductors 120, 121). The filler elements making up filler 127 may be said to occupy voids defined between the inside of the protective armor 128 and the outsides of conductors 121, 122 (or the outsides of the metal sheaths encapsulating the conductors 121, 122). The filler elements making up filler 126, 127 can reduce the risk of insulations 123, 124, 125 and/or the metal sheaths encapsulating insulations 123, 124, 125 swelling excessively in response to high temperatures in the downhole environment, thereby reducing the risk of rupturing metal sheaths encapsulating the insulations 123, 124, 125, thereby reducing the risk of rapid degradation of the insulations 123, 124, 125 in the presence of fluids downhole in the wellbore 15.

Note that at distances greater than ¼ inch from the termination of the protective armor 118 to a distance ¼ inch from the termination of the protective armor 128 the insulations 113, 114, 115, 123, 124, 125 and metal sheath encapsulations may be properly wrapped with protective and constraining tapes that can constrain the insulations 113, 114, 115, 123, 124, 125 in the area between fillers 116, 117, 120, 122. In an embodiment, a portion of the insulators 113, 114, 115 within about ¼ inch, within about ½ inch, and/or within about 1 inch of the termination of the armor 118 is unconstrained by tape and is constrained instead by filler elements 116-1, 116-2, 117-1, 117-2. Tape may be applied in the region proximate to the protective armor 118, but it may not be possible, due to limitations of close working quarters between conductors, to apply it in such a way as to provide a constraining benefit from the tape. In an embodiment, a portion of the insulators 123, 124, 125 within about ¼ inch, within about ½ inch, and/or within about 1 inch of the termination of the armor 128 is unconstrained by tape and is constrained instead by filler elements 126 and 127. Tape may be applied in the region proximate to the termination of the protective armor 128, but it may not be possible, due to limitations of close working quarters between conductors, to apply it in such a way as to provide a constraining benefit from the tape. By sizing the filler 116, 117, 126, 127 to the length (about 4 inches or from about 3 inches to about 5 inches in length) suitable to providing the constraint where it is needed—within about 1 inch of the termination of the protective armor—instead of extending the filler length from the termination of the protective armor 118 to the splice sleeves 130, 132, 134, materials can be conserved, reducing capital costs associated with the electric power cable 75 and reducing the amount of waste products ultimately disposed into the environment after decommissioning of the electric power cable 75. As an example, using about 4 inch long filler 116, 117, 126, 127 instead of about 19 inch long filler extending from the termination of the protective armor 118 to the splice sleeves 130, 132, 134 is a significant reduction of waste material.

As seen in FIG. 2C, a third protective armor 138 is wrapped over the splice 106 and overlaps onto the first protective armor 118 of the first segment 102 and onto the second protective armor 128 of the second segment 104. The third protective armor 138 may be substantially similar to the first protective armor 118 and the second protective armor 128. A first end of the third protective armor 138 may be attached or affixed to the first protective armor 118 by soldering the third protective armor 138 to the first protective armor 118. A second end of the third protective armor 138 may be attached or affixed to the second protective armor 128 by soldering the third protective armor 138 to the second protective armor 128.

In an embodiment, each of the first plurality of electric conductors (110, 111, 112) is encapsulated in an insulation layer (113, 114, 115) that is unconstrained against expansion by tape proximate to a termination of the first protective armor 118 (e.g., within about ¼ inch, ½ inch, ¾ inch, 1 inch, 1.25 inches, 1.5 inches, 1.75 inches, 2.0 inches, 2.25 inches, 2.5 inches, 2.75 inches, 3.0 inches, 3.25 inches, or 3.5 inches of the termination of the first protective armor 118) and the fillers 116, 117 at least partially constrain the insulation layers (113, 114, 115) of the first plurality of electric conductors (110, 111, 112) against expansion where the insulation layers (113, 114, 115) of the first plurality of electric conductors (110, 111, 112) are unconstrained by tape and each of the second plurality of electric conductors (120, 121, 122) is encapsulated in an insulation layer (123, 124, 125) that is unconstrained against expansion by tape proximate to a termination of the second protective armor 128 (e.g., within about ¼ inch, ½ inch, ¾ inch, 1 inch, 1.25 inches, 1.5 inches, 1.75 inches, 2.0 inches, 2.25 inches, 2.5 inches, 2.75 inches, 3.0 inches, 3.25 inches, or 3.5 inches of the termination of the second protective armor 128) and the fillers 125, 128 at least partially constrain the insulation layers (123, 124, 125) of the second plurality of electric conductors (120, 121, 122) against expansion where the insulation layers (123, 124, 125) of the second plurality of electric conductors (120, 121, 122) are unconstrained by tape. In an embodiment, the insulation layers (113, 114, 115) of the first plurality of electric conductors (110, 111, 112) are constrained against expansion by tape from about 2 inches away from the termination of the first protective armor 118 to the plurality of splice sleeves (130, 132, 134) and the insulation layers (123, 124, 125) of the second plurality of electric conductors (120, 121, 122) are constrained against expansion by tape from about 2 inches away from the termination of the second protective armor 128 to the plurality of splice sleeves (130, 132, 134). The insulation layers (113, 114, 115) of the first plurality of electric conductors (110, 111, 112) may be unconstrained by tape proximate to the termination of the first protective armor 118 and the insulation layers (123, 124, 125) of the second plurality of electric conductors (120, 121, 122) may be unconstrained by tape proximate the termination of the second protective armor 128 because close working quarters between adjacent electric conductors proximate the first and second protective armor prohibits application of tape smoothly and with suitably even tension at these locations.

The electric power cable 75 that has the splice 106 built into it may be a new cable that includes a splice made in a manufacturing shop, or the splice may be introduced into a new cable out at a wellbore location. Alternatively, the electric power cable 75 may include one or more portions of used or refurbished cable that has been connected together via one or more splices 106 to extend the life of the electric power cable 75, for example to remove irreparably damaged portions of a cable and splicing the remaining good portions back together in order to reuse same without entirely scrapping the originally damaged cable. Further details about installing the fillers 116, 117, 126, 127 and of preparing the splice 106 are described below in the Example portion of the detailed description.

Turning now to FIG. 3, a method 200 is described. In an embodiment, the method 200 is a method of building an electric submersible pump (ESP) power cable. The method 200 may apply to building a new electric power cable or may apply to refurbishing a used electric power cable. At block 202, the method 200 comprises removing a first portion of a first protective armor from an end of a first portion of flat ESP power cable comprising a first plurality of electric conductors. For example, about 20 inches of protective armor is removed. In an embodiment, the first plurality of electric conductors comprises three electric conductors, for example to supply three-phase power to an ESP.

At block 204, the method 200 comprises removing insulation in part from ends of the first plurality of electric conductors, for example removing 5, 4.5, 4, 3.5, 3, 2.5, 2, 1.5, 1, or 0.5 inches of insulation. Sufficient insulation may be removed from the ends of the first plurality of electric conductors to permit the end of the electric conductors to be inserted half-way into the splice sleeves 130, 132, 133. In an embodiment, the method 200 may further comprise cutting off an end (e.g., a length of 10, 9, 8, 7, 6, 5, 4, 3, 2.5, 2, 1.5, 1, or 0.5 inches) of one or two of the first plurality of electric conductors, whereby to stagger the placement of the splice sleeves 130, 132, 134 described above with reference to FIG. 2A, FIG. 2B, and FIG. 2C. At block 206, the method 200 comprises removing a second portion of a second protective armor from an end of a second portion of flat ESP power cable comprising a second plurality of electric conductors. For example, about 20 inches of protective armor is removed from the second portion of flat ESP power cable. In an embodiment, the second plurality of electric conductors comprises three electric conductors.

At block 208, the method 200 comprises removing insulation in part from ends of the second plurality of electric conductors, for example removing 5, 4.5, 4, 3.5, 3, 2.5, 2, 1.5, 1, or 0.5 inches of insulation. Explanatory comments associated with block 204 above apply to block 208 in like fashion. In an embodiment, the method 200 may further comprise cutting off an end (e.g., a length of 10, 9, 8, 7, 6, 5, 4, 3, 2.5, 2, 1.5, 1, or 0.5 inches) of one or two of the second plurality of electric conductors, whereby to stagger the placement of the splice sleeves 130, 132, 134 described above with reference to FIG. 2A, FIG. 2B, and FIG. 2C. It is noted that the cutting off ends of each conductor ought to be coordinated with the cutting off of ends of each conductor pair (e.g., leaving first conductor 110 uncut associates to cutting 8 inches off of its pair: fourth conductor 120, cutting four inches off second conductor 111 associates to cutting 4 inches off its pair: fifth conductor 121; and cutting eight inches off third conductor 112 associates to leaving sixth conductor 122 uncut).

At block 210, the method 200 comprises splicing each of one of the first plurality of electric conductors to a corresponding one of the second plurality of electric conductors. For example, the electric conductors are coupled by splice sleeves and the splice sleeves are crimped. In an embodiment, the action of splicing each one of the first plurality of electric conductors to a corresponding one of the second plurality of electric conductors of block 210 comprises coupling each pair of electric conductors with a splice sleeve and crimping the splice sleeve, thereby forming three pairs of spliced electric conductors. For example, the processing of block 210 may be said to form a first pair of electric conductors by coupling electric conductor 110 to electric conductor 120 with splice sleeve 130, to form a second pair of electric conductors by coupling electric conductor 111 to electric conductor 121 with splice sleeve 132, and to form a third pair of electric conductors by coupling electric conductor 112 to electric conductor 122 with splice sleeve 134.

In an embodiment, the method 200 may further comprise wrapping each pair of spliced electric conductors with tape from proximate a termination of the first protective armor to proximate a termination of the second protective armor, wherein the insulation on the first plurality of electric conductors is constrained by the tape from about 2 inches away from the termination of the first protective armor to the splice sleeve, wherein the insulation on the first plurality of electric conductors is unconstrained by the tape from the termination of the first protective armor to about 2 inches away from the termination of the first protective armor, wherein the insulation on the second plurality of electric conductors is constrained by the tape from about 2 inches away from the termination of the second protective armor to the splice sleeve, and wherein the insulation on the second plurality of electric conductors is unconstrained by the tape from the termination of the second protective armor to about 2 inches away from the termination of the second protective armor. The insulation on the first plurality of electric conductors may be unconstrained by the tape from the termination of the first protective armor to about 2 inches away from the termination of the first protective armor and the insulation on the second plurality of electric conductors may be unconstrained by the tape from the termination of the second protective armor to about 2 inches away from the termination of the second protective armor because close working quarters between adjacent electric conductors proximate the first and second protective armor prohibits application of the tape smoothly and with suitably even tension at these locations. In another embodiment, the first plurality of electric conductors and the second plurality of electric conductors may be unconstrained by the tape over a different distance than 2 inches away from the termination of the first and second protective armors, respectively. For example, the first and second plurality of electric conductors may be unconstrained by the tape from the termination of the protective armor to a distance of about ¼ inch away from the protective armor, of about ½ inch away from the protective armor, of about ¾ inch away from the protective armor, of about 1 inch away from the protective armor, of about 1.25 inches away from the protective armor, of about 1.5 inches away from the protective armor, of about 1.75 inches away from the protective armor, of about 2.0 inches away from the protective armor, of about 2.25 inches away from the protective armor, of about 2.5 inches away from the protective armor, of about 2.75 inches away from the protective armor, of about 3 inches away from the protective armor, of about 3.25 inches away from the protective armor, or of about 3.5 inches away from the protective armor.

At block 212, the method 200 comprises securing a first filler along the first plurality of electric conductors. For example, in an embodiment, the first filler comprises four filler elements, and filler elements 116-1, 116-2, 117-1, 117-2 are installed and secured along the electric conductors 110, 111, 112, for example in an arrangement as shown in FIGS. 2A and 2B. In an embodiment, the first filler may be secured along the first plurality of electric conductors (e.g., over a lead jacket encapsulating a layer of insulation over each electric conductor) with tape, for example with high modulus PTFE tape. In an embodiment, the insulation on the first plurality of electric conductors is constrained by the first filler from about the termination of the first protective armor to at least about 2 inches away from the termination of the first protective armor (or about ¼ inch, ½ inch, ¾ inch, 1 inch, 1.25 inches, 1.5 inches, 1.75 inches, 2.25 inches, 2.5 inches, 2.75 inches, 3.0 inches, 3.25 inches, or 3.5 inches away from the termination of the first protective armor).

At block 213, the method 200 comprises securing a second filler along the second plurality of electric conductors. For example, in an embodiment, the second filler comprises four filler elements, and four filler elements (similar to filler elements 116-1, 116-2, 117-1, 117-2) are installed and secured along electric conductors 120, 121, 122 in like manner, for example as shown in FIGS. 2A and 2B. In an embodiment, the second filler may be secured along the second plurality of electric conductors (e.g., over a lead jacket encapsulating a layer of insulation over each electric conductor) with tape, for example with high modulus PTFE tape. In an embodiment, the insulation on the second plurality of electric conductors is constrained by the second filler from about the termination of the second protective armor to at least about 2 inches away from the termination of the second protective armor (or about ¼ inch, ½ inch, ¾ inch, 1 inch, 1.25 inches, 1.5 inches, 1.75 inches, 2.25 inches, 2.5 inches, 2.75 inches, 3.0 inches, 3.25 inches, or 3.5 inches away from the termination of the second protective armor).

In an embodiment, securing the first filler along the first plurality of electric conductors comprises securing a first one of the filler elements of the first filler in a first void defined between a first electric conductor and a second electric conductor of the first plurality of electric conductors on a first side of the first portion of flat ESP power cable, securing a second one of the filler elements of the first filler in a second void defined between the first electric conductor and the second electric conductor of the first plurality of electric conductors on a second side of the first portion of flat ESP power cable, securing a third one of the filler elements of the first filler in a third void defined between the second electric conductor and a third electric conductor of the first plurality of electric conductors on the first side of the first portion of flat ESP power cable, and securing a fourth one of the filler elements of the first filler in a fourth void defined between the second electric conductor and the third electric conductor of the first plurality of electric conductors on the second side of the first portion of flat ESP power cable. In an embodiment, securing the second filler along the second plurality of electric conductors comprises securing a first one of the filler elements of the second filler in a fifth void defined between a first electric conductor and a second electric conductor of the second plurality of electric conductors on a first side of the second portion of flat ESP power cable, securing a second one of the filler elements of the second filler in a sixth void defined between the first electric conductor and the second electric conductor of the second plurality of electric conductors on a second side of the second portion of flat ESP power cable, securing a third one of the filler elements of the second filler in a seventh void defined between the second electric conductor and a third electric conductor of the second plurality of electric conductors on the first side of the second portion of flat ESP power cable, and securing a fourth one of the filler elements of the second filler in an eighth void defined between the second electric conductor and the third electric conductor of the second plurality of electric conductors on the second side of the second portion of flat ESP power cable. In an aspect, the filler elements are secured by extending ends 140a, 140b, 140c, and 140d a distance under protective armor 118 or 128. In an aspect, an adhesive (e.g., glue, epoxy resin, etc.) is applied to one or more of ends 140a, 140b, 140c, and 140d prior to, concurrent with, or after placement a distance under protective armor 118 or 128, wherein the adhesive aids in holding the filler elements in place.

At block 214, the method 200 comprises installing a third portion of a third protective armor over the first filler and the second filler and over the splicing of the first plurality of electric conductors to the corresponding second plurality of electric conductors. The processing of block 214 may comprise soldering the third protective armor at one end to the first protective armor and soldering the third protective armor at an opposite end to the second protective armor. In an embodiment, the first protective armor, the second protective armor, and the third protective armor are each formed from a metal tape and wherein installing the third portion of the third protective armor comprises soldering a first end of the third protective armor to the first protective armor and soldering an opposite end of the third protective armor to the second protective armor.

Figure 4:
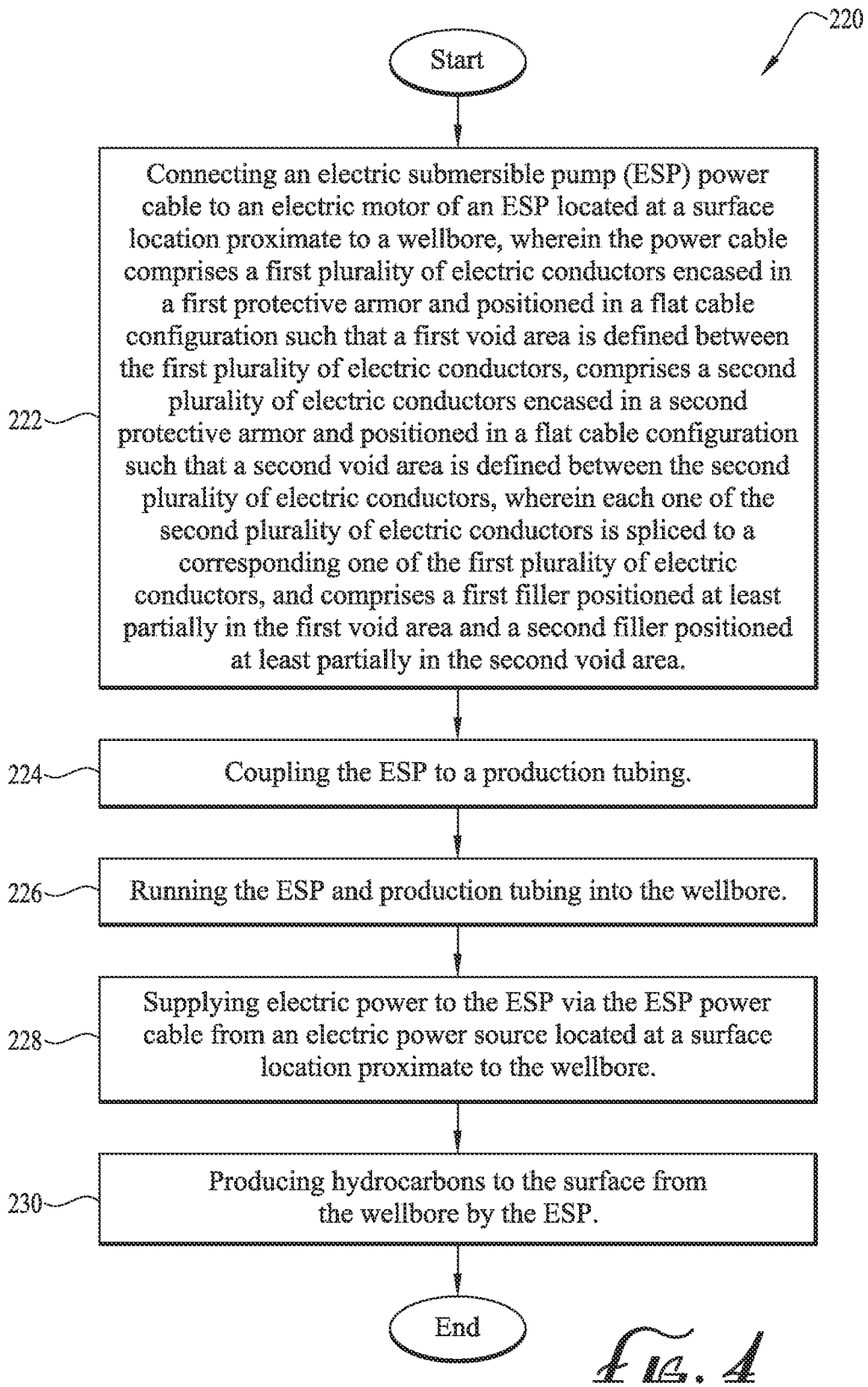
FIG. 4 is a flow chart of another method according to an embodiment of the disclosure.

Turning now to FIG. 4, a method 220 is described. In an embodiment, the method 220 is a method of recovering hydrocarbons from a subterranean formation. At block 222, the method 220 comprises connecting an electric submersible pump (ESP) power cable to an electric motor of an ESP located at a surface location proximate to a wellbore, wherein the power cable comprises a first plurality of electric conductors encased in a first protective armor and positioned in a flat cable configuration such that a first void area is defined between the first plurality of electric conductors, comprises a second plurality of electric conductors encased in a second protective armor and positioned in a flat cable configuration such that a second void area is defined between the second plurality of electric conductors, wherein each one of the second plurality of electric conductors is spliced to a corresponding one of the first plurality of electric conductors, and comprises a first filler positioned at least partially in the first void area and a second filler positioned at least partially in the second void area, for example as shown in FIGS. 2A, 2B, and 2C and prepared in accordance with FIG. 3. Alternatively, the power cable has a round profile or a round cross-section.

At block 224, the method 220 comprises coupling the ESP to a production tubing. At block 226, the method 220 comprises running the ESP and production tubing into the wellbore.

At block 228, the method 220 comprises supplying electric power to the ESP via the ESP power cable from an electric power source located at a surface location proximate to the wellbore. At block 230, the method 220 comprises producing hydrocarbons to the surface from the wellbore by the ESP.

Figure 5:
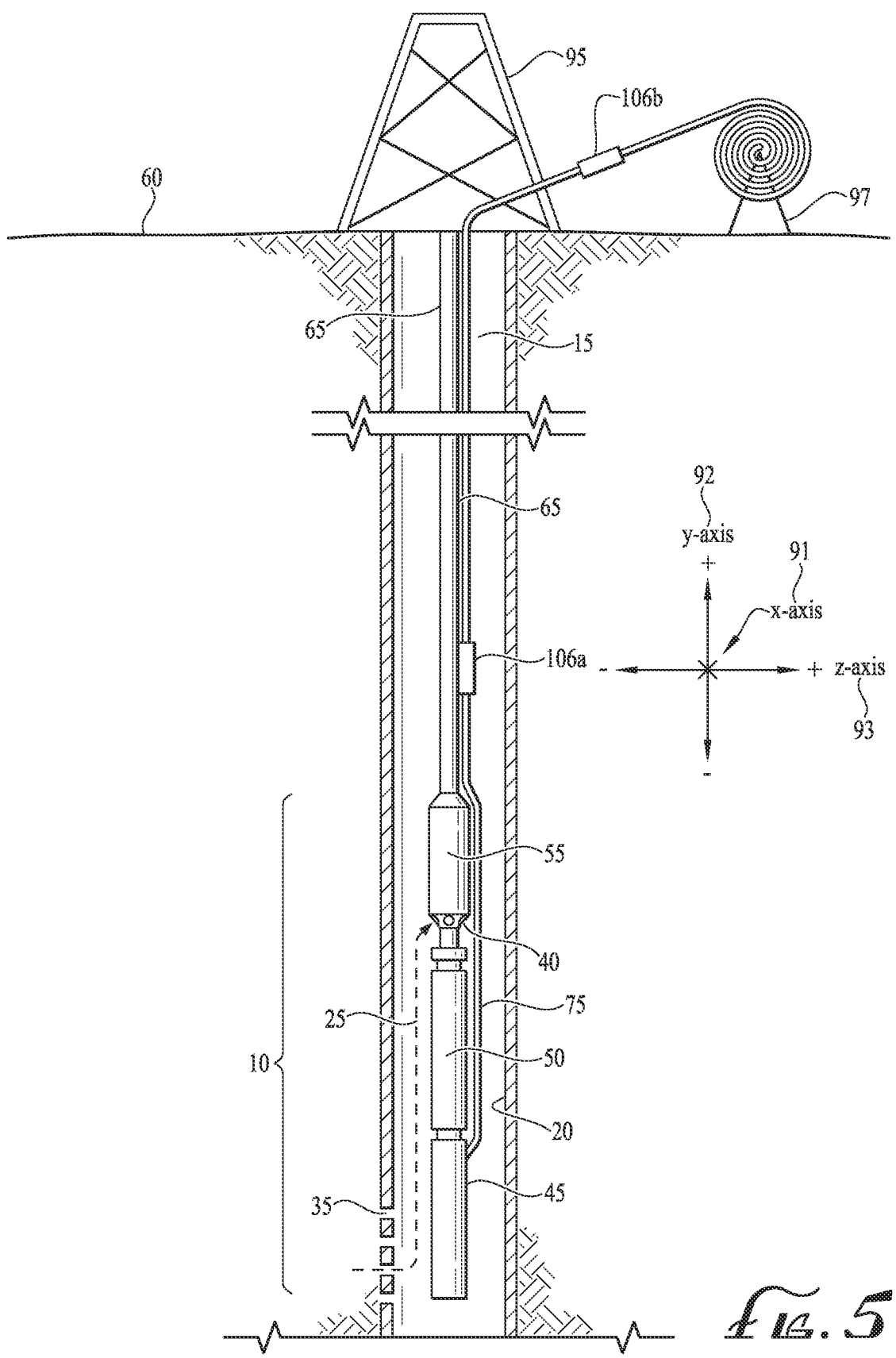
FIG. 5 is an illustration of a wellbore and a mast structure during initial deployment of the exemplary well completion according to an embodiment of the disclosure.

Turning now to FIG. 5, the ESP assembly 10, the production tubing 65, and the power cable 75 are shown during run-in of the ESP assembly 10. The power cable may comprise one or more splices 106, for example of the type described with reference to FIGS. 2A, 2B, and 2C. The ESP assembly 10 and production tubing 65 are supported by a mast 95, for example by a block and tackle hoist of the mast 95. As the ESP assembly 10 and production tubing 65 are run in, the electric power cable 75 is rolled off of a spool 97. The power cable 75 may be connected to the electric motor 45 while the ESP assembly 10 is being made up at the surface 60. In an embodiment, a motor lead extension (MLE) is connected to the electric motor 45 (e.g., to a motor head coupled to the electric motor 45), and the MLE may be spliced to the electric power cable 75 as illustrated in and described with reference to FIG. 2A, FIG. 2B, and FIG. 2C above. The electric power cable 75 may be spliced in other portions in like manner, for example as shown by splices 106a and 106b. As the ESP assembly 10 and production tubing 65 are run into the wellbore 15, the electric power cable 75 may be secured to the ESP assembly 10 and/or to the production tubing 65 with clamps, brackets, or bands.

EXAMPLE

Further details of an exemplary splicing procedure are described. It is understood that there may be further nuances or alternative actions involved in the splicing procedure that are not described herein. It is advised that workers avoid cuts in conductors, avoid sharp edges on the splice sleeves, and avoid or minimize gaps between splice sleeves and insulation. Avoid cutting lead jackets. Avoid cutting insulation where not directed to cut. It is advised that clean conditions be maintained and avoiding metal shavings, oil, grease, or dirt infiltrating the splice. Most importantly, it is advised that workers use extreme care to avoid cutting their hands or other parts of their body. They should consider wearing cut-resistant gloves when possible while building the splice.

For flat electric power cable remove at least 19 inches of protective armor from each of the segments of electric power cable to be spliced (e.g., remove about 19 inches of armor 118 from first segment 102 and remove about 19 inches of armor 128 from second segment 104). For round electric power cable remove at least 21 inches of protective armor from each of the segments of the electric power cable to be spliced. Remove protective tapes and/or braid located over the lead jackets encapsulating the insulation of the phases back to the armor on both segments of power cable. For each segment of power cable in sequence, brace the outer phases of a flat power cable and gently bend the two outer phases in opposite directions away from the middle phase and in the same plane as the flat cable to no more than about 30 degrees relative to the middle phase. Bending the phases excessively may damage the conductor, the insulation, or the lead jacket over the insulation. The purpose of this bending operation is to make the area between the phases accessible for applying high modulus PTFE tape as close to the termination of the armor as possible. The high modulus PTFE tape provides support to constrain the lead jacket and/or the insulation of each phase in high temperature conditions in the wellbore and during decompression when removed from the wellbore. The limitation on properly applying this high modulus PTFE tape all the way up to the termination of the armor can cause a weak point in the splice and it is to overcome this potential weak point that employment of the filler 116, 117 is directed to.

For each segment of power cable in sequence, wrap two layers of high modulus PTFE tape on each of the three phases starting from as close to the termination of the protective armor as possible and 2 inches onto the lead jacket or insulation. Gently bend the outer phases back to meet with the inner phase. Lay the fillers (e.g., filler elements 116-1, 116-2, 117-1, 117-2 and corresponding elements of filler 126 and 127) into the void area between the phases, slip one end of each filler under the terminal end of the armor about ¼ inch, if possible. Care should be taken to mate the fillers with the proper alignment to the void area between the phases. Each filler may be about 4 inches long. Wrap two layers of high modulus PTFE tape around all three phases of the segment of power cable starting one inch onto the armor and extending one inch onto the three phases and onto the fillers, thereby securing the fillers in place. This can provide stress relief of the lead jackets and/or of the insulation of the phases. Fold the fillers back onto the armor and temporarily tape them down onto the armor with tape.

For each segment, stagger the phases, taking note to stagger the phases of the first segment in an opposite sense from the staggering of the second segment. For example, leave a first phase of the first segment at original length, cut about 4 inches off the end of a second (middle) phase of the first segment, and cut about 8 inches off the end of a third phase of the first segment. Cut about 8 inches off the end of a fourth phase of the second segment (to be spliced to the first phase of the first segment), cut about 4 inches off the end of a fifth phase of the second segment (to be spliced to the second phase of the first segment), and leave a sixth phase of the second segment (to be spliced to the third phase of the first segment) at original length. An alternate staggering of phases such as that illustrated in FIG. 2A is possible.

Prepare each of the six phases as is described below for the first phase. Remove 3 inches of lead jacket from the end of the first phase, avoiding cutting into the underlying insulation. Remove about ⅞ inch of insulation from the end of the first phase, avoiding cutting into the underlying conductor. Couple the first phase to the fourth phase by slipping a first open end of a splice sleeve over the exposed conductor of the first phase, slipping a second open end of the splice sleeve over the exposed conductor of the fourth phase, and crimping the splice sleeve onto the conductors of the first phase and of the fourth phase. The splice sleeve may be crimped at multiple locations to the conductor of the first phase and crimped at multiple locations to the conductor of the fourth phase. Repeat this process to couple the second phase to the fifth phase and to couple the third phase to the sixth phase. Proper crimping tools should be used for this coupling process and checking the crimp with go/no-go gauge may be desired. Sand and smooth any burrs or rough edges left on the splice sleeve.

In an embodiment, form a taper in the end of the lead jacket about 1 inch in length on each phase to allow a smooth transition when applying layers of insulation and/or containment tape. Clean the lead jackets of the phases with an appropriate dielectric cleaner to remove oxidation, as needed. Clean the insulation and the splice sleeve with dielectric cleaner first and with a clean rag second.

When applying high temperature tape and high modulus tape in the following process, it is desirable to stretch these tapes to deform to about 50% of their original width, whereby to achieve proper hoop strength and maximum bonding. It is advised that deforming the tapes beyond this limit (e.g., to less than 50% of their original width) may be detrimental to electrical insulating properties of the tapes. In some circumstances, additional tape layers may be applied to achieve desired smooth transitions and tapers, for example between an MLE and a conventional electric power cable.

For each pair of phases (e.g., for the phase one/phase four pair, for the phase two/phase five pair, and for the phase three/phase six pair) wrap at least six layers of high temperature FEP tape around the splice sleeve and proximate insulation. For the first layer start about ½ inch onto the insulation on one side of the splice sleeve and wrap the tape helically around the spliced phases and splice sleeve to about ½ inch onto the insulation of the opposite side of the splice sleeve. Wrap the tape with an overlap of about 50%. For each subsequent layer of tape, extend the layer ½ inch further onto the insulation on each side of the splice sleeve. DO NOT extend the tape onto the lead jacket. The primary purpose of the high temperature FEP tape is to provide insulation as well as to seal and keep well fluids and gases away from the exposed copper of the splice sleeve and/or the inside of the insulation.

For each pair of the phases, wrap at least four layers of high modulus PTFE tape over the pair of phases between the lead jackets. If needed, add additional layers of high modulus PTFE tape to build up the diameter to make a smooth transition to the lead jacket. For the last layer of high modulus PTFE tape, extend the tape 1 inch over the lead jacket on both sides of the splice sleeve. The main purpose of the high modulus PTFE tape is to provide containment to the insulation against thermal expansion and gas decompression, but it may further augment dielectric strength of the underlying high temperature FEP tape and insulation.

For each pair of phases, wrap at least three layers of lead foil tape around the phase pair proximate the splice sleeve. For the first layer of lead foil tape, begin about 1 inches past the high modulus PTFE tape on the lead jacket of one phase and wrap the lead foil tape helically with an overlap of about 50% to 1 inch past the high modulus PTFE tape on the lead jacket on the sibling phase. Apply the lead foil tape using one hand and smooth the lead foil tape on the phase with the opposite hand. Do not attempt to stretch the lead foil tape but do wrap it tightly. When the first layer of lead foil tape is applied, the end of the lead foil tape can be wrapped over with high temperature tape to prevent it unraveling. Smooth the first layer of lead foil tape with a smooth object that is non-abrasive. To apply the second layer of lead foil tape, begin 1 inch past the first layer of lead foil tape and wrap in the opposite direction to 1 inch past the opposite end of the first layer of lead foil tape. To apply the third layer of lead foil tape, begin 1 inch past the second layer of lead foil tape and wrap in the opposite direction to 1 inch past the opposite end of the second layer of lead foil tape. The purpose of the lead foil tape is to prevent H2S and other gases migrating into the electric power cable.

For each pair of phases, wrap at least two layers of high modulus PTFE tape over the lead foil tape. Begin wrapping the first layer of high modulus PTFE tape at least 1 inch onto the lead jacket (e.g., past the lead foil tape) and extend the first layer of high modulus PTFE tape at least 1 inch onto the lead jacket beyond the lead foil tape on the opposite end of the phase pair. The last layer of high modulus PTFE tape should extend as far as possible towards the armor at each end of the cable splice but will be limited by the location of the fillers at each end. More than two layers of high modulus PTFE tape can optionally be applied if it is desired to increase the diameter to smooth transitions.

For each pair of phases, wrap one layer of double stick silicone fiberglass tape helically around the pair of phases from near the fillers at one end to near the fillers at the opposite end. The purpose of the double stick silicone fiberglass tape is to promote sticking the phases together and holding them together in a flat configuration.

Remove the tape temporarily securing the fillers folded back over the protective armor. Stick the fillers into place in the void between the phases by contacting them to the surface of the double stick silicone fiberglass tape. Wrap two layers of high modulus PTFE tape beginning about 2 inches onto the armor on one end of the electric power cable around all three phases to hold the phases together to about 2 inches onto the armor at the opposite end of the electric power cable. Wrap two layers of white fiberglass tape over the high modulus PTFE tape over all three phases. The white fiberglass tape protects the high modulus PTFE tape during the armoring process.

Pull out three wraps of armor from a piece of hollow armor to be used to cover between the original armor over the two segments of electric power cable. The hollow armor that is used to wrap the splice may be chosen to be at least 10 inches longer than the span to be covered by the new armor. Hammer the first two inches flat in preparation for soldering to one piece of the original armor. Clamp the flattened end of the hollow armor to the original armor and solder to the original armor. It is recommended to use 40/60 or 50/50 acid core solder. Wrap the hollow armor helically around the power cable in the region of the splice to about 2 inches onto the existing armor on the opposite side of the splice. Try to keep the new armor tightly wrapped, without damaging the underlying tapes and materials. It is desirable to mate the new armor to itself by assuring that the armor lays within the interlocks of the adjacent portion of armor. Cut off the loose end of the armor from the hollow armor and flatten the last 2 inches of the armor. Solder this loose end to the original armor. A good solder joint is about 1 inch wide and covers the original armor and the new armor applied over the splice. A wooden dowel may be inserted into the open end of the hollow armor as it is being wrapped onto the power cable to obtain leverage to make a tight wrap.

It will be appreciated that many alterations may be made to this procedure for splicing the segments of power cable without departing from the teachings regarding using the filler material to prop the insulation and/or lead jacket proximate the terminal ends of the original armor in each of the segments. Those skilled in the art may know that some sequences of steps may be altered from the sequence described above. For example, the installation of the filler might be deferred further towards the end of the splicing procedure rather than installing early in the procedure as described here.

Additional Disclosure

The following are non-limiting, specific embodiments in accordance with the present disclosure:

A first embodiment, which is an electric submersible pump (ESP) power cable, comprising a first plurality of electric conductors encased in a first protective armor and positioned in a flat cable configuration such that a first void area is defined between the first plurality of electric conductors, a second plurality of electric conductors encased in a second protective armor and positioned in a flat cable configuration such that a second void area is defined between the second plurality of electric conductors, wherein each one of the second plurality of electric conductors is spliced to a corresponding one of the first plurality of electric conductors, a first filler positioned at least partially in the first void area, and a second filler positioned at least partially in the second void area.

A second embodiment, which is the ESP power cable of the first embodiment, wherein each of the first plurality of electric conductors is encapsulated in an insulation layer that is unconstrained against expansion by tape proximate to a termination of the first protective armor and the first filler at least partially constrains the insulation layers of the first plurality of electric conductors against expansion where the insulation layers of the first plurality of electric conductors are unconstrained by tape, and wherein each of the second plurality of electric conductors is encapsulated in an insulation layer that is unconstrained against expansion by tape proximate to a termination of the second protective armor and the second filler at least partially constrains the insulation layers of the second plurality of electric conductors against expansion where the insulation layers of the second plurality of electric conductors are unconstrained by tape.

A third embodiment, which is the ESP power cable of the second embodiment, further comprising a plurality of splice sleeves that couple the first plurality of electric conductors to the second plurality of electric conductors, wherein the insulation layers of the first plurality of electric conductors are constrained against expansion by tape from about 2 inches away from the termination of the first protective armor to the plurality of splice sleeves and the insulation layers of the second plurality of electric conductors are constrained against expansion by tape from about 2 inches away from the termination of the second protective armor to the plurality of splice sleeves.

A fourth embodiment, which is the ESP power cable of any of the second and the third embodiments, wherein the insulation layers of the first plurality of electric conductors are unconstrained by tape proximate to the termination of the first protective armor and the insulation layers of the second plurality of electric conductors are unconstrained by tape proximate the termination of the second protective armor because close working quarters between adjacent electric conductors proximate the first and second protective armor prohibits application of tape with suitably even tension at these locations.

A fifth embodiment, which is the ESP power cable of any of the first through the fourth embodiments, wherein the first filler and the second filler comprise a thermoplastic material.

A sixth embodiment, which is the ESP power cable of any of the first through the fifth embodiments, wherein the first filler and the second filler comprise a fluorinated ethylene propylene (FEP) material.

A seventh embodiment, which is the ESP power cable of any of the first through the sixth embodiments, wherein the first filler comprises four filler elements, each filler element of the first filler having an about triangular cross-sectional shape and wherein the second filler comprises four filler elements, each filler element of the second filler having an about triangular cross-sectional shape.

An eighth embodiment, which is the ESP power cable of the seventh embodiment, wherein each of the filler elements of the first filler and each of the filler elements of the second filler is elongated.

A ninth embodiment, which is the ESP power cable of the eighth embodiment, wherein each of the filler elements of the first filler and each of the filler elements of the second filler define a cavity that extends the length of the filler element.

A tenth embodiment, which is the ESP power cable of any of the eighth and the ninth embodiments, wherein an end of each of the filler elements of the first filler is positioned under an edge of the first protective armor and an end of each of the filler elements of the second filler is positioned under an edge of the second protective armor.

An eleventh embodiment, which is the ESP power cable of any of the first through the tenth embodiments, wherein each of the first plurality of electric conductors is connected to a corresponding one of the second plurality of electric conductors by a splice sleeve.

A twelfth embodiment, which is the ESP power cable of any of the first through the eleventh embodiments, wherein each of the first plurality of electric conductors and each of the second plurality of electric conductors is encapsulated in a metal jacket.

A thirteenth embodiment, which is the ESP power cable of any of the first through the twelfth embodiments, wherein each of the first plurality of electric conductors and each of the second plurality of electric conductors is encapsulated in a lead sheath.

A fourteenth embodiment, which is the ESP power cable of the thirteenth embodiment, wherein each of the lead sheaths is wrapped in a high modulus polytetrafluoroethylene (PTFE) tape.

A fifteenth embodiment, which is the ESP power cable of any of the first through the fourteenth embodiments, wherein the first plurality of electric conductors comprise three conductors and the second plurality of electric conductors comprise three conductors.

A sixteenth embodiment, which is a method of building an electric submersible pump (ESP) power cable, comprising removing a first portion of a first protective armor from an end of a first portion of flat ESP power cable comprising a first plurality of electric conductors, removing insulation in part from ends of the first plurality of electric conductors, removing a second portion of a second protective armor from an end of a second portion of flat ESP power cable comprising a second plurality of electric conductors, removing insulation in part from ends of the second plurality of electric conductors, splicing each one of the first plurality of electric conductors to a corresponding one of the second plurality of electric conductors, securing a first filler along the first plurality of electric conductors, securing a second filler along the second plurality of electric conductors, and installing a third portion of a third protective armor over the first filler and the second filler and over the splicing of the first plurality of electric conductors to the corresponding second plurality of electric conductors.

A seventeenth embodiment, which is the method of the sixteenth embodiment, wherein the first filler comprises four filler elements and the second filler comprises four filler elements.

An eighteenth embodiment, which is the method of the seventeenth embodiment, wherein securing the first filler along the first plurality of electric conductors comprises securing a first one of the filler elements of the first filler in a first void defined between a first electric conductor and a second electric conductor of the first plurality of electric conductors on a first side of the first portion of flat ESP power cable, securing a second one of the filler elements of the first filler in a second void defined between the first electric conductor and the second electric conductor of the first plurality of electric conductors on a second side of the first portion of flat ESP power cable, securing a third one of the filler elements of the first filler in a third void defined between the second electric conductor and a third electric conductor of the first plurality of electric conductors on the first side of the first portion of flat ESP power cable, and securing a fourth one of the filler elements of the first filler in a fourth void defined between the second electric conductor and the third electric conductor of the first plurality of electric conductors on the second side of the first portion of flat ESP power cable, and wherein securing the second filler along the second plurality of electric conductors comprises securing a first one of the filler elements of the second filler in a fifth void defined between a first electric conductor and a second electric conductor of the second plurality of electric conductors on a first side of the second portion of flat ESP power cable, securing a second one of the filler elements of the second filler in a sixth void defined between the first electric conductor and the second electric conductor of the second plurality of electric conductors on a second side of the second portion of flat ESP power cable, securing a third one of the filler elements of the second filler in a seventh void defined between the second electric conductor and a third electric conductor of the second plurality of electric conductors on the first side of the second portion of flat ESP power cable, and securing a fourth one of the filler elements of the second filler in an eighth void defined between the second electric conductor and the third electric conductor of the second plurality of electric conductors on the second side of the second portion of flat ESP power cable A nineteenth embodiment, which is the method of any of the sixteenth through the eighteenth embodiments, wherein the first protective armor, the second protective armor, and the third protective armor are each formed from a metal tape and wherein installing the third portion of the third protective armor comprises soldering a first end of the third protective armor to the first protective armor and soldering an opposite end of the third protective armor to the second protective armor.

A twentieth embodiment, which is the method of any of the sixteenth through the nineteenth embodiments, wherein the first plurality of electric conductors comprise three electric conductors and the second plurality of electric conductors comprise three electric conductors.

A twenty-first embodiment, which is the method of the twentieth embodiment, wherein splicing each one of the first plurality of electric conductors to a corresponding one of the second plurality of electric conductors comprises coupling each pair of electric conductors with a splice sleeve and crimping the splice sleeve, thereby forming three pairs of spliced electric conductors, further comprising wrapping each pair of spliced electric conductors with tape from proximate a termination of the first protective armor to proximate a termination of the second protective armor, wherein the insulation on the first plurality of electric conductors is constrained by the tape from about 2 inches away from the termination of the first protective armor to the splice sleeve, wherein the insulation on the first plurality of electric conductors is unconstrained by the tape from the termination of the first protective armor to about 2 inches away from the termination of the first protective armor, wherein the insulation on the first plurality of electric conductors is constrained by the first filler from about the termination of the first protective armor to at least about 2 inches away from the termination of the first protective armor, wherein the insulation on the second plurality of electric conductors is constrained by the tape from about 2 inches away from the termination of the second protective armor to the splice sleeve, wherein the insulation on the second plurality of electric conductors is unconstrained by the tape from the termination of the second protective armor to about 2 inches away from the termination of the second protective armor, and wherein the insulation on the second plurality of electric conductors is constrained by the second filler from about the termination of the second protective armor to at least about 2 inches away from the termination of the second protective armor.

A twenty-second embodiment, which is the method of the twenty-first embodiment, wherein the insulation on the first plurality of electric conductors is unconstrained by the tape from the termination of the first protective armor to about 2 inches away from the termination of the first protective armor and the insulation on the second plurality of electric conductors is unconstrained by the tape from the termination of the second protective armor to about 2 inches away from the termination of the second protective armor because close working quarters between adjacent electric conductors proximate the first and second protective armor prohibits application of the tape with suitably even tension at these locations.

A twenty-third embodiment, which is a method of recovering hydrocarbons from a subterranean formation, comprising connecting an electric submersible pump (ESP) power cable to an electric motor of an ESP located at a surface location proximate to a wellbore, wherein the power cable comprises a first plurality of electric conductors encased in a first protective armor and positioned in a flat cable configuration such that a first void area is defined between the first plurality of electric conductors, comprises a second plurality of electric conductors encased in a second protective armor and positioned in a flat cable configuration such that a second void area is defined between the second plurality of electric conductors, wherein each one of the second plurality of electric conductors is spliced to a corresponding one of the first plurality of electric conductors, and comprises a first filler positioned at least partially in the first void area and a second filler positioned at least partially in the second void area, coupling the ESP to a production tubing, running the ESP and production tubing into the wellbore, supplying electric power to the ESP via the ESP power cable from an electric power source located at a surface location proximate to the wellbore, and producing hydrocarbons to the surface from the wellbore by the ESP.

A twenty-fourth embodiment, which is the method of the twenty-third embodiment, wherein the first plurality of electric conductors comprise three electric conductors, the second plurality of electric conductors comprise three electric conductors, and the electric power source provides three-phase electric power.

A twenty-fifth embodiment, which is the method of any of the twenty-third and the twenty-fourth embodiments, wherein the ESP comprises the electric motor, a seal unit, and a pump that receives rotational mechanical power from the electric motor.

A twenty-sixth embodiment, which is an electric submersible pump (ESP) power cable, comprising a first plurality of electric conductors encased in a first protective armor wherein a first void area is defined between the first plurality of electric conductors and the first protective armor, comprising a second plurality of electric conductors encased in a second protective armor wherein a second void area is defined between the second plurality of electric conductors and the second protective armor and wherein each one of the second plurality of electric conductors is spliced to a corresponding one of the first plurality of electric conductors, comprising a first filler positioned at least partially in the first void area, and comprising a second filler positioned at least partially in the second void area.

A twenty-seventh embodiment, which is the ESP power cable of the twenty-sixth embodiment, wherein each of the first plurality of electric conductors is encapsulated in an insulation layer that is unconstrained against expansion by tape proximate to a termination of the first protective armor and the first filler at least partially constrains the insulation layers of the first plurality of electric conductors against expansion where the insulation layers of the first plurality of electric conductors are unconstrained by tape, and wherein each of the second plurality of electric conductors is encapsulated in an insulation layer that is unconstrained against expansion by tape proximate to a termination of the second protective armor and the second filler at least partially constrains the insulation layers of the second plurality of electric conductors against expansion where the insulation layers of the second plurality of electric conductors are unconstrained by tape.

A twenty-eighth embodiment, which is the ESP power cable of the twenty-seventh embodiment, further comprising a plurality of splice sleeves that couple the first plurality of electric conductors to the second plurality of electric conductors, wherein the insulation layers of the first plurality of electric conductors are constrained against expansion by tape from about 2 inches away from the termination of the first protective armor to the plurality of splice sleeves and the insulation layers of the second plurality of electric conductors are constrained against expansion by tape from about 2 inches away from the termination of the second protective armor to the plurality of splice sleeves.

A twenty-ninth embodiment, which is the ESP power cable of any of the twenty-seventh and the twenty-eighth embodiments, wherein the insulation layers of the first plurality of electric conductors are unconstrained by tape proximate to the termination of the first protective armor and the insulation layers of the second plurality of electric conductors are unconstrained by tape proximate the termination of the second protective armor because close working quarters between adjacent electric conductors proximate the first and second protective armor prohibits application of tape with suitably even tension at these locations.

A thirtieth embodiment, which is the ESP power cable of any of the twenty-sixth through the twenty-ninth embodiments, wherein the first filler and the second filler comprise a thermoplastic material.

A thirty-first embodiment, which is the ESP power cable of any of the twenty-sixth through the thirtieth embodiments, wherein the first filler and the second filler comprise a fluorinated ethylene propylene (FEP) material.

A thirty-second embodiment, which is the ESP power cable of any of twenty-sixth through the thirty-first embodiments, wherein the first filler comprises four filler elements and wherein the second filler comprises four filler elements.

A thirty-third embodiment, which is the ESP power cable of the thirty-second embodiment, wherein each of the filler elements of the first filler and each of the filler elements of the second filler is elongated.

A thirty-fourth embodiment, which is the ESP power cable of the thirty-third embodiment, wherein each of the filler elements of the first filler and each of the filler elements of the second filer define a cavity that extends the length of the filler element.

A thirty-fifth embodiment, which is the ESP power cable of any of the thirty-third and the thirty-fourth embodiments, wherein an end of each of the filler elements of the first filler is positioned under an edge of the first protective armor and an end of each of the filler elements of the second filler is positioned under an edge of the second protective armor.

A thirty-sixth embodiment, which is the ESP power cable of any of the twenty-sixth through thirty-fifth embodiments, wherein each of the first plurality of electric conductors is connected to a corresponding one of the second plurality of electric conductors by a splice sleeve.

A thirty-seventh embodiment, which is the ESP power cable of any of the twenty-sixth through thirty-sixth embodiments, wherein each of the first plurality of electric conductors and each of the second plurality of electric conductors is encapsulated in a metal jacket.

A thirty-eighth embodiment, which is the ESP power cable of any of the twenty-sixth through thirty-seventh embodiments, wherein each of the first plurality of electric conductors and each of the second plurality of electric conductors is encapsulated in a lead sheath.

A thirty-ninth embodiment, which is the ESP power cable of the thirty-eighth embodiment, wherein each of the lead sheaths is wrapped in a high modulus polytetrafluoroethylene (PTFE) tape.

A fortieth embodiment, which is the ESP power cable of any of the twenty-sixth through the thirty-ninth embodiments, wherein the first plurality of electric conductors comprise three conductors and the second plurality of electric conductors comprise three conductors.

A forty-first embodiment, which is a method of building an electric submersible pump (ESP) power cable, comprising removing a first portion of a first protective armor from an end of a first portion of ESP power cable comprising a first plurality of electric conductors, removing insulation in part from ends of the first plurality of electric conductors, removing a second portion of a second protective armor from an end of a second portion of ESP power cable comprising a second plurality of electric conductors, removing insulation in part from ends of the second plurality of electric conductors, splicing each one of the first plurality of electric conductors to a corresponding one of the second plurality of electric conductors, securing a first filler along the first plurality of electric conductors, securing a second filler along the second plurality of electric conductors, and installing a third portion of a third protective armor over the first filler and the second filler and over the splicing of the first plurality of electric conductors to the corresponding second plurality of electric conductors.

A forty-second embodiment, which is the method of the forty-first embodiment, wherein the first filler comprises four filler elements and the second filler comprises four filler elements.

A forty-third embodiment, which is the method of the forty-second embodiment, wherein securing the first filler along the first plurality of electric conductors comprises securing a first one of the filler elements of the first filler in a first void defined between a first electric conductor and a second electric conductor of the first plurality of electric conductors on a first side of the first portion of ESP power cable, securing a second one of the filler elements of the first filler in a second void defined between the first electric conductor and the second electric conductor of the first plurality of electric conductors on a second side of the first portion of ESP power cable, securing a third one of the filler elements of the first filler in a third void defined between the second electric conductor and a third electric conductor of the first plurality of electric conductors on the first side of the first portion of ESP power cable, and securing a fourth one of the filler elements of the first filler in a fourth void defined between the second electric conductor and the third electric conductor of the first plurality of electric conductors on the second side of the first portion of ESP power cable, and wherein securing the second filler along the second plurality of electric conductors comprises securing a first one of the filler elements of the second filler in a fifth void defined between a first electric conductor and a second electric conductor of the second plurality of electric conductors on a first side of the second portion of ESP power cable, securing a second one of the filler elements of the second filler in a sixth void defined between the first electric conductor and the second electric conductor of the second plurality of electric conductors on a second side of the second portion of ESP power cable, securing a third one of the filler elements of the second filler in a seventh void defined between the second electric conductor and a third electric conductor of the second plurality of electric conductors on the first side of the second portion of ESP power cable, and securing a fourth one of the filler elements of the second filler in an eighth void defined between the second electric conductor and the third electric conductor of the second plurality of electric conductors on the second side of the second portion of ESP power cable A forty-fourth embodiment, which is the method of any of the forty-first through forty-third embodiments, wherein the first protective armor, the second protective armor, and the third protective armor are each formed from a metal tape and wherein installing the third portion of the third protective armor comprises soldering a first end of the third protective armor to the first protective armor and soldering an opposite end of the third protective armor to the second protective armor.

A forty-fifth embodiment, which is the method of any of the forty-first through forty-fourth embodiments, wherein the first plurality of electric conductors comprise three electric conductors and the second plurality of electric conductors comprise three electric conductors.

A forth-sixth embodiment, which is the method of the forth-fifth embodiment, wherein splicing each one of the first plurality of electric conductors to a corresponding one of the second plurality of electric conductors comprises coupling each pair of electric conductors with a splice sleeve and crimping the splice sleeve, thereby forming three pairs of spliced electric conductors, further comprising wrapping each pair of spliced electric conductors with tape from proximate a termination of the first protective armor to proximate a termination of the second protective armor, wherein the insulation on the first plurality of electric conductors is constrained by the tape from about 2 inches away from the termination of the first protective armor to the splice sleeve, wherein the insulation on the first plurality of electric conductors is unconstrained by the tape from the termination of the first protective armor to about 2 inches away from the termination of the first protective armor, wherein the insulation on the first plurality of electric conductors is constrained by the first filler from about the termination of the first protective armor to at least about 2 inches away from the termination of the first protective armor, wherein the insulation on the second plurality of electric conductors is constrained by the tape from about 2 inches away from the termination of the second protective armor to the splice sleeve, wherein the insulation on the second plurality of electric conductors is unconstrained by the tape from the termination of the second protective armor to about 2 inches away from the termination of the second protective armor, and wherein the insulation on the second plurality of electric conductors is constrained by the second filler from about the termination of the second protective armor to at least about 2 inches away from the termination of the second protective armor.

A forth-seventh embodiment, which is the method of the forty-sixth embodiment, wherein the insulation on the first plurality of electric conductors is unconstrained by the tape from the termination of the first protective armor to about 2 inches away from the termination of the first protective armor and the insulation on the second plurality of electric conductors is unconstrained by the tape from the termination of the second protective armor to about 2 inches away from the termination of the second protective armor because close working quarters between adjacent electric conductors proximate the first and second protective armor prohibits application of the tape with suitably even tension at these locations.

A forty-eighth embodiment, which is a method of recovering hydrocarbons from a subterranean formation, comprising connecting an electric submersible pump (ESP) power cable to an electric motor of an ESP located at a surface location proximate to a wellbore, wherein the power cable comprises a first plurality of electric conductors encased in a first protective armor wherein a first void area is defined between the first plurality of electric conductors and the first protective armor, comprises a second plurality of electric conductors encased in a second protective armor wherein a second void area is defined between the second plurality of electric conductors and the second protective armor and wherein each one of the second plurality of electric conductors is spliced to a corresponding one of the first plurality of electric conductors, comprises a first filler positioned at least partially in the first void area, and comprises a second filler positioned at least partially in the second void area, coupling the ESP to a production tubing, running the ESP and production tubing into the wellbore, supplying electric power to the ESP via the ESP power cable from an electric power source located at a surface location proximate to the wellbore, and producing hydrocarbons to the surface from the wellbore by the ESP.

A forty-ninth embodiment, which is the method of the forty-eighth embodiment, wherein the first plurality of electric conductors comprise three electric conductors, the second plurality of electric conductors comprise three electric conductors, and the electric power source provides three-phase electric power.

A fiftieth embodiment, which is the method of any of the forty-eighth and the forty-ninth embodiments, wherein the ESP comprises the electric motor, a seal unit, and a pump that receives rotational mechanical power from the electric motor.

A fifty-first embodiment, which is the method of any of the forty-eighth through fiftieth embodiments, wherein the first plurality of electric conductors are arranged in a round cable configuration and the second plurality of electric conductors are arranged in a round cable configuration.

A fifty-second embodiment, which is the ESP power cable of any of the twenty-sixth through the fortieth embodiment, wherein the first plurality of electric conductors are arranged in a round cable configuration and the second plurality of electric conductors are arranged in a round cable configuration.

A fifty-third embodiment, which is the method of any of the forty-first through forty-seventh embodiment, wherein the first plurality of electric conductors are arranged in a round cable configuration and the second plurality of electric conductors are arranged in a round cable configuration.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An electric submersible pump (ESP) power cable, comprising:
    a first plurality of electric conductors encased in a first protective armor and positioned in a flat cable configuration such that a first void area is defined between the first plurality of electric conductors;
    a second plurality of electric conductors encased in a second protective armor and positioned in a flat cable configuration such that a second void area is defined between the second plurality of electric conductors, wherein each one of the second plurality of electric conductors is spliced to a corresponding one of the first plurality of electric conductors by a single crimped splice sleeve;
    a first filler from 3 inches to 5 inches long positioned at least partially in the first void area and extending between 0.1 inches and 1 inch under an edge of the first protective armor; and
    a second filler from 3 inches to 5 inches long positioned at least partially in the second void area and extending between 0.1 inches and 1 inch under an edge of the second protective armor.

2. The ESP power cable of claim 1,
    wherein each of the first plurality of electric conductors is encapsulated in an insulation layer that is unconstrained against expansion by tape proximate to a termination of the first protective armor and the first filler at least partially constrains the insulation layers of the first plurality of electric conductors against expansion where the insulation layers of the first plurality of electric conductors are unconstrained by tape; and
    wherein each of the second plurality of electric conductors is encapsulated in an insulation layer that is unconstrained against expansion by tape proximate to a termination of the second protective armor and the second filler at least partially constrains the insulation layers of the second plurality of electric conductors against expansion where the insulation layers of the second plurality of electric conductors are unconstrained by tape.

3. The ESP power cable of claim 2, wherein the insulation layers of the first plurality of electric conductors are constrained against expansion by tape from about 2 inches away from the termination of the first protective armor to the plurality of splice sleeves and the insulation layers of the second plurality of electric conductors are constrained against expansion by tape from about 2 inches away from the termination of the second protective armor to the plurality of splice sleeves.

4. The ESP power cable of claim 2, wherein the insulation layers of the first plurality of electric conductors are unconstrained by tape proximate to the termination of the first protective armor and the insulation layers of the second plurality of electric conductors are unconstrained by tape proximate the termination of the second protective armor because close working quarters between adjacent electric conductors proximate the first and second protective armor prohibits application of tape with suitably even tension at these locations.

5. The ESP power cable of claim 1, wherein the first filler and the second filler comprise a thermoplastic material.

6. The ESP power cable of claim 1, wherein the first filler and the second filler comprise a fluorinated ethylene propylene (FEP) material.

7. The ESP power cable of claim 1, wherein the first filler comprises four filler elements, each filler element of the first filler having an about triangular cross-sectional shape and wherein the second filler comprises four filler elements, each filler element of the second filler having an about triangular cross-sectional shape.

8. The ESP power cable of claim 7, wherein each of the filler elements of the first filler and each of the filler elements of the second filer define a cavity that extends the length of the filler element.

9. The ESP power cable of claim 1, wherein each of the first plurality of electric conductors and each of the second plurality of electric conductors is encapsulated in a lead sheath.

10. The ESP power cable of claim 9, wherein each of the lead sheaths is wrapped in a high modulus polytetrafluoroethylene (PTFE) tape.

11. The ESP power cable of claim 1, wherein the first plurality of electric conductors comprise three conductors and the second plurality of electric conductors comprise three conductors.

12. The ESP power cable of claim 1, wherein the lengths of the projections of the first plurality of conductors beyond the first protective armor are staggered and wherein the lengths of the projections of the second plurality of conductors beyond the second protective armor are staggered.

13. A method of building an electric submersible pump (ESP) power cable, comprising:
removing a first portion of a first protective armor from an end of a first portion of flat ESP power cable comprising a first plurality of electric conductors;
removing insulation in part from ends of the first plurality of electric conductors;
removing a second portion of a second protective armor from an end of a second portion of flat ESP power cable comprising a second plurality of electric conductors;
removing insulation in part from ends of the second plurality of electric conductors;
splicing each one of the first plurality of electric conductors to a corresponding one of the second plurality of electric conductors by a single crimped splice sleeve;
securing a first filler from 3 inches to 5 inches long along the first plurality of electric conductors and extending between 0.1 inches and 1 inch under an edge of the first protective armor;
securing a second filler from 3 inches to 5 inches long along the second plurality of electric conductors and extending between 0.1 inches and 1 inch under an edge of the second protective armor; and
installing a third portion of a third protective armor over the first filler and the second filler and over the splicing of the first plurality of electric conductors to the corresponding second plurality of electric conductors.

14. The method of claim 13, wherein the first filler comprises four filler elements and the second filler comprises four filler elements, wherein securing the first filler along the first plurality of electric conductors comprises securing a first one of the filler elements of the first filler in a first void defined between a first electric conductor and a second electric conductor of the first plurality of electric conductors on a first side of the first portion of flat ESP power cable, securing a second one of the filler elements of the first filler in a second void defined between the first electric conductor and the second electric conductor of the first plurality of electric conductors on a second side of the first portion of flat ESP power cable, securing a third one of the filler elements of the first filler in a third void defined between the second electric conductor and a third electric conductor of the first plurality of electric conductors on the first side of the first portion of flat ESP power cable, and securing a fourth one of the filler elements of the first filler in a fourth void defined between the second electric conductor and the third electric conductor of the first plurality of electric conductors on the second side of the first portion of flat ESP power cable, and
wherein securing the second filler along the second plurality of electric conductors comprises securing a first one of the filler elements of the second filler in a fifth void defined between a first electric conductor and a second electric conductor of the second plurality of electric conductors on a first side of the second portion of flat ESP power cable, securing a second one of the filler elements of the second filler in a sixth void defined between the first electric conductor and the second electric conductor of the second plurality of electric conductors on a second side of the second portion of flat ESP power cable, securing a third one of the filler elements of the second filler in a seventh void defined between the second electric conductor and a third electric conductor of the second plurality of electric conductors on the first side of the second portion of flat ESP power cable, and securing a fourth one of the filler elements of the second filler in an eighth void defined between the second electric conductor and the third electric conductor of the second plurality of electric conductors on the second side of the second portion of flat ESP power cable.

15. The method of claim 13, wherein the first protective armor, the second protective armor, and the third protective armor are each formed from a metal tape and wherein installing the third portion of the third protective armor comprises soldering a first end of the third protective armor to the first protective armor and soldering an opposite end of the third protective armor to the second protective armor.

16. The method of claim 13, wherein the first plurality of electric conductors comprise three electric conductors and the second plurality of electric conductors comprise three electric conductors, further comprising wrapping each pair of spliced electric conductors with tape from proximate a termination of the first protective armor to proximate a termination of the second protective armor, wherein the insulation on the first plurality of electric conductors is constrained by the tape from about 2 inches away from the termination of the first protective armor to the splice sleeve, wherein the insulation on the first plurality of electric conductors is unconstrained by the tape from the termination of the first protective armor to about 2 inches away from the termination of the first protective armor, wherein the insulation on the first plurality of electric conductors is constrained by the first filler from about the termination of the first protective armor to at least about 2 inches away from the termination of the first protective armor, wherein the insulation on the second plurality of electric conductors is constrained by the tape from about 2 inches away from the termination of the second protective armor to the splice sleeve, wherein the insulation on the second plurality of electric conductors is unconstrained by the tape from the termination of the second protective armor to about 2 inches away from the termination of the second protective armor, and wherein the insulation on the second plurality of electric conductors is constrained by the second filler from about the termination of the second protective armor to at least about 2 inches away from the termination of the second protective armor.

17. The method of claim 16, wherein the insulation on the first plurality of electric conductors is unconstrained by the tape from the termination of the first protective armor to about 2 inches away from the termination of the first protective armor and the insulation on the second plurality of electric conductors is unconstrained by the tape from the termination of the second protective armor to about 2 inches away from the termination of the second protective armor because close working quarters between adjacent electric conductors proximate the first and second protective armor prohibits application of the tape with suitably even tension at these locations.

18. The method of claim 13, further comprising cutting off an end of at least one of the first plurality of electric conductors and cutting off an end of at least one of the second plurality of electric conductors to stagger placement of the crimped splice sleeves.

19. A method of recovering hydrocarbons from a subterranean formation, comprising:
connecting an electric submersible pump (ESP) power cable to an electric motor of an ESP located at a surface location proximate to a wellbore, wherein the power cable comprises a first plurality of electric conductors encased in a first protective armor and positioned in a flat cable configuration such that a first void area is defined between the first plurality of electric conductors, comprises a second plurality of electric conductors encased in a second protective armor and positioned in a flat cable configuration such that a second void area is defined between the second plurality of electric conductors, wherein each one of the second plurality of electric conductors is spliced to a corresponding one of the first plurality of electric conductors by a single crimped splice sleeve, and comprises a first filler from 3 inches to 5 inches long positioned at least partially in the first void area and extending between 0.1 inches and 1 inch under an edge of the first protective armor and a second filler from 3 inches to 5 inches long positioned at least partially in the second void area and extending between 0.1 inches and 1 inch under an edge of the second protective armor;

coupling the ESP to a production tubing;

running the ESP and production tubing into the wellbore;

supplying electric power to the ESP via the ESP power cable from an electric power source located at a surface location proximate to the wellbore; and producing hydrocarbons to the surface from the wellbore by the ESP.

20. The method of claim 19, wherein the first filler and the second filler comprise a thermoplastic.

\* \* \* \* \*